(12) United States Patent
Yamada et al.

(10) Patent No.: US 11,012,987 B2
(45) Date of Patent: May 18, 2021

(54) BASE STATION DEVICE, MOBILE STATION DEVICE, PROGRAM, UPLINK SYNCHRONIZATION REQUESTING METHOD, AND SYNCHRONIZATION-SHIFT MEASUREMENT SIGNAL TRANSMITTING METHOD

(71) Applicant: SHARP KABUSHIKI KAISHA, Sakai, Osaka (JP)

(72) Inventors: Shohei Yamada, Sakai (JP); Yasuyuki Kato, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/121,190

(22) Filed: Sep. 4, 2018

(65) Prior Publication Data

US 2019/0021073 A1    Jan. 17, 2019

Related U.S. Application Data

(63) Continuation of application No. 15/334,982, filed on Oct. 26, 2016, now Pat. No. 10,085,250, which is a (Continued)

(30) Foreign Application Priority Data

Jun. 12, 2007    (JP) .................................. 2007-155289

(51) Int. Cl.
*H04W 72/04* (2009.01)
*H04W 56/00* (2009.01)
(Continued)

(52) U.S. Cl.
CPC ......... *H04W 72/042* (2013.01); *H04L 5/0053* (2013.01); *H04W 56/001* (2013.01);
(Continued)

(58) Field of Classification Search
None
See application file for complete search history.

(56) References Cited

U.S. PATENT DOCUMENTS 7,054,298 B1   5/2006 Kim et al.
2003/0096631 A1   5/2003 Kayama et al.
(Continued)

FOREIGN PATENT DOCUMENTS

JP    3542558 B2    4/2004
JP    2006-522534 A    9/2006
(Continued)

OTHER PUBLICATIONS

3GPP TR (Technical Report) 25.814, V7.0.0 (Jun. 2006), Physical Layer Aspects for Evolved Universal Terrestrial Radio Access (UTRA), pp. 1-126.
(Continued)

*Primary Examiner* — Shripal K Khajuria
(74) *Attorney, Agent, or Firm* — Birch, Stewart, Kolasch & Birch, LLP

(57) ABSTRACT

A mobile station device that receives downlink control information which is used to selectively provide downlink scheduling or a random access order, on a physical downlink control channel from a base station device. The mobile station device also transmits a random access preamble using a random access channel to the base station device based on receiving the downlink control information which provides a random access order, where the downlink control information provides a downlink resource allocation in a case that the downlink control information is used to provide the downlink scheduling and where a preset value is set for a field of the downlink resource allocation in a case that the downlink control information is used to provide the random access order.

16 Claims, 15 Drawing Sheets

Related U.S. Application Data continuation of application No. 14/743,809, filed on Jun. 18, 2015, now Pat. No. 9,516,631, which is a continuation of application No. 14/098,048, filed on Dec. 5, 2013, now Pat. No. 9,094,168, which is a continuation of application No. 12/527,680, filed as application No. PCT/JP2008/060706 on Jun. 11, 2008, now Pat. No. 8,681,716.

(51) Int. Cl.
  *H04W 74/08* (2009.01)
  *H04L 5/00* (2006.01)
  *H04W 92/10* (2009.01)

(52) U.S. Cl.
  CPC ..... *H04W 56/0005* (2013.01); *H04W 56/005* (2013.01); *H04W 56/0045* (2013.01); *H04W 56/0055* (2013.01); *H04W 72/0413* (2013.01); *H04W 74/08* (2013.01); *H04W 92/10* (2013.01)

(56) References Cited

U.S. PATENT DOCUMENTS

| | | | | |
|---|---|---|---|---|
| 2004/0077357 | A1* | 4/2004 | Nakada | H04B 1/7113 455/452.1 |
| 2006/0166688 | A1 | 7/2006 | Sun et al. | |
| 2007/0072600 | A1* | 3/2007 | Cho | H04W 40/12 455/423 |
| 2008/0117891 | A1* | 5/2008 | Damnjanovic | H04W 72/04 370/345 |
| 2008/0273610 | A1* | 11/2008 | Malladi | H04W 74/002 375/260 |
| 2009/0186613 | A1 | 7/2009 | Ahn et al. | |
| 2009/0316653 | A1* | 12/2009 | Meyer | H04W 74/002 370/331 |
| 2010/0331003 | A1 | 12/2010 | Park et al. | |
| 2010/0331037 | A1* | 12/2010 | Jen | H04L 1/1887 455/522 |
| 2011/0134774 | A1* | 6/2011 | Pelletier | H04L 5/001 370/252 |
| 2012/0051451 | A1* | 3/2012 | Kwon | H04L 5/0057 375/285 |
| 2012/0069790 | A1* | 3/2012 | Chung | H04W 72/042 370/315 |
| 2012/0106460 | A1* | 5/2012 | Yang | H04L 5/0098 370/328 |

FOREIGN PATENT DOCUMENTS

| | | |
|---|---|---|
| JP | 2006-522534 B | 9/2006 |
| RU | 2191479 C2 | 10/2002 |
| WO | WO 2004/077919 A2 | 9/2004 |
| WO | WO 2007/052746 A1 | 5/2007 |
| WO | WO 2008/111785 A1 | 9/2008 |

OTHER PUBLICATIONS

3GPP TS (Technical Specification) 36,300, V0.90 (Mar. 2007), Evolved Universal Terrestrial Radio Access (E-UTRA) and evolved Universal Terrestrial Radio Access Network (E-UTRAN), Overall Description Stage 2, pp. 1-82.
International Preliminary Report on Patentability dated Sep. 28, 2009 for International Application No. PCT/JP2008/060706.
International Search Report dated Sep. 22, 2008 for International Application No. PCT/JP2008/060706.
Japanese Notice of Reasons for Rejection on Japanese Patent Application No. 2009-191379, Feb. 9, 2010.
Japanese Notice of Reasons for Rejection on Japanese Patent Application No. 2009-191380, Feb. 9, 2010.
Japanese Notice of Reasons for Rejection on Japanese Patent Application No. 2009-519289, Feb. 9, 2010.
Japanese Office Action issued in Japanese Application No. 2009-519289 dated Jan. 4, 2011, including an English translation.
JP2009-191379, Japanese Notice of Allowance, dated Jan. 25, 2011.
JP2009-191380, Japanese Notice of Allowance, dated Jan. 25, 2011.
JP2009-519289, Japanese Notice of Allowance dated Feb. 15, 2011.
NEC et al., "Signalling on DL data arrival," 3GPP TSG-RAN WG2 Meeting #61, Sorrento, Italy, R2-080833, Feb. 11-15, 2008, 4 pages, XP-050138652.
NEC, eNB/UE behavior regarding handling of dedicated signature, 3GPP R2-073097, 3GPP, Aug. 20, 2007.
Nokia et al., "L1/L2 Control Channel Format for Timing Alignment Procedure," 3GPP TSG-RAN WG2 Meeting #58bis, Orlando, FL, USA, R2-072402, Jun. 25-29, 2007, 2 pages, XP-002632434.
Nokia et al., "Signaling for RA preamble assignment," 3GPP TSG-RAN WG2 Meeting #59, Athens, Greece, R2-073060, Aug. 20-24, 2007, 2 pages, XP-050135797.
Non-Final Office Action of copending U.S. Appl. No. 12/527,680, dated Mar. 9, 2012.
Non-Final Office Action of copending U.S. Appl. No. 12/549,272, dated Mar. 28, 2012.
Non-Final Office Action of copending U.S. Appl. No. 12/549,230, dated Apr. 2, 2012.
Panasonic, "Random Access Preamble signature usuage", 3 GPP TSG RAN WG2 #57, 3GPP R2-070524, 3GPP, Feb. 12, 2007.
R1-050850 "Physical Channel and Multiplexing in Evolved UTRA Uplink", 3GPP TSG RAN WG1 Meeting #42 London, UK, Aug. 29-Sep. 2, 2005, pp. 1-14.
R2-062165 "UL Synchronization", 3GPP TSG RAN WG2 Meeting #54 Tallinn, Aug. 28-Sep. 1, 2006.
Sharp, "UL Sync Request," 3GPP TSG-RAN WG2#58bis, Orlando, FL, USA, R2-072378, Jun. 25-29, 2007, pp. 1/3-3/3, XP-050135225.
TSG-RAN WG1, "LS reply on PDCCH for DL data arrival and random access response format," 3GPP TSG RAN WG1 Meeting #53, Kansas City, MO, USA, R1-082251, May 5-9, 2008, 2 pages, XP-002632437.
U.S. Advisory Action issued in U.S. Appl. No. 12/527,680 dated Jan. 24, 2013.
U.S. Notice of Allowance issued in U.S. Appl. No. 12/527,680 dated Sep. 13, 2013.
U.S. Notice of Allowance issued in U.S. Appl. No. 14/098,048 dated Mar. 19, 2015.
U.S. Office Action dated Oct. 19, 2011 for copending U.S. Appl. No. 12/549,272.
U.S. Office Action dated Oct. 6, 2011 for copending U.S. Appl. No. 12/527,680.
U.S. Office Action dated Oct. 6, 2011 for copending U.S. Appl. No. 12/549,230.
U.S. Office Action issued in U.S. Appl. No. 12/549,272 dated Oct. 19, 2011.
U.S. Office Action issued in U.S. Appl. No. 12/527,680 dated Mar. 9, 2012.
U.S. Office Action issued in U.S. Appl. No. 12/527,680 dated May 10, 2013.
U.S. Office Action issued in U.S. Appl. No. 12/527,680 dated Nov. 16, 2012.
U.S. Office Action issued in U.S. Appl. No. 12/527,680 dated Oct. 6, 2011.
U.S. Office Action issued in U.S. Appl. No. 12/549,230 dated May 10, 2013.
U.S. Office Action issued in U.S. Appl. No. 12/549,272 dated Nov. 7, 2012.
U.S. Office Action issued in U.S. Appl. No. 14/098,048 dated Sep. 29, 2014.
ZTE, "message 2 issue in random access procedure" 3GPP R2-071281, 3GPP, Mar. 26, 2007.
Non-Final Office Action issued in copending U.S. Appl. No. 15/334,982 dated Sep. 25, 2017.
Notice of Allowance issued in copending U.S. Appl. No. 15/334,982 dated May 23, 2018.
Notice of Allowance issued in U.S. Appl. No. 14/743,809 dated Sep. 2, 2016.

(56) References Cited

OTHER PUBLICATIONS

U.S. Notice of Allowance issued in U.S. Appl. No. 12/549,272 dated Feb. 27, 2013.
U.S. Office Action issued in U.S. Appl. No. 12/549,272 dated Feb. 5, 2013.
U.S. Office Action issued in U.S. Appl. No. 14/743,809 dated Aug. 17, 2016.
U.S. Office Action issued in U.S. Appl. No. 14/743,809 dated Mar. 11, 2016.
3GPP TS 25.212 V7.4.0, 3rd Generation Partnership Project; Technical Specification Group Radio Access Network; Multiplexing and channel coding (FDD) (Release 7) (Mar. 2007), pp. 1-100.
3GPP TS RAN WG2 #56, R2-063401, "Uplink Synchronization", Nov. 6-10, 2006, Riga, Latvia, pp. 1-3.
3GPP TSG RAN Meeting #36, RP-070494, "CR to 36.300", Busan, Korea, May 29-Jun. 1, 2007, 46 pages.
3GPP TSG RAN WG1#47bis, R1-070281, "Uplink Timing Control for E-UTRA", Sorrento, Italy, Jan. 15-19, 2007, pp. 1-5.
3GPP TSG RAN WG2 #57bis, R2-071320, "Considerations on L1/L2 Control Signaling", Mar. 26-30, 2007, St. Julian's, Malta, pp. 1-3.
3GPP TSG RAN WG2 #57bis, Tdoc R2-071446, "Clarification and Optimization for Message 2", Mar. 26-30, 2007, St. Julian's, Malta, pp. 1-6.
3GPP TSG RAN WG2 #58, Tdoc R2-071939, "Optimization for message 2 transmission", May 7-11, 2007, Kobe, Japan, pp. 1-2.
3GPP TSG RAN1#47-bis, R1-070045, "Uplink Timing Control", Sorrento, Italy, Jan. 15-19, 2006, pp. 1-2.
3GPP TSG-RAN WG1 LTE Ad Hoc, R1-061793, "Paging Design for E-UTRA", Jun. 27-30, 2006, Cannes, France, pp. 1-3.
3GPP TSG-RAN WG1 LTE Ad Hoc, R1-061799, "Design of L1/L2 Control in E-UTRA DL", Cannes, France, Jun. 27-30, 2006, pp. 1-5.
3GPP TSG-RAN2 Meeting #57, Tdoc R2-070687, "Use of Dedicated RACH Signatures", St. Louis, USA, Feb. 12-16, 2007, pp. 1-4.
3GPP TSG RAN WG1#48, R1-070741, "Transmission of Uplink Timing Advance Command in E-UTRA," Saint Louis, USA, Feb. 12-16, 2007, pp. 1-4.
3GPP TSG-RAN WG1 #44, R1-063078, "EUTRA Uplink Timing Control," Riga, Lafvia, Nov. 6-10, 2006, 2 pages.
3GPP TSG-RAN WG1 #44, R1-060461, "DL PHY channels: Overall structure," Denver CO, USA, Feb. 13-17, 2006, pp. 1-10.
3GPP TSG-RAN WG1 #45, R1-061501, "Link analysis for control channel in support of DL-SCH," Shanghai, China, May 8-12, 2006, pp. 1-4.
3GPP TR (Technical Report) 21.905 V8.0.0 (Mar. 2007), 3rd Generation Partnership Project; Technical Specification Group Services and System Aspects; Vocabulary for 3GPP Specifications (Release 8), 54 pages.
Nokia Siemens Networks, 3GPP TSG-RAN2 Meeting #58, R2-072338, "Updated on Mobility, Security, Random Access Procedure etc.," Kobe, Japan, May 7-11, 2007, pp. 221-250.
NTT DoCoMo, Inc., 3GPP TSG-RAN #57, R2-070778, "Contention-based and Contention-free Access Procedures in LTE," Saint-Louis, USA, Feb. 12-16, 2007, pp. 211-213.
Samsung, 3GPP TSG-RAN3 Meeting #56bis, R2-070205, "LTE cell load/RACH load estimations," Sorrento, Italy, Jan. 15-19, 2007, pp. 214-220.
ZTE, TSG-RAN Working Group 2 meeting #56bis, R2-070029, "intra-LTE handover procedure by using dedicated signature," Sorrento, Italy, Jan. 15-19, 2007, pp. 165-169.

* cited by examiner

BASE STATION DEVICE, MOBILE STATION DEVICE, PROGRAM, UPLINK SYNCHRONIZATION REQUESTING METHOD, AND SYNCHRONIZATION-SHIFT MEASUREMENT SIGNAL TRANSMITTING METHOD

This application is a Continuation of Ser. No. 15/334,982, filed Oct. 26, 2016, which is a Continuation of Ser. No. 14/743,809, filed Jun. 18, 2015 (now U.S. Pat. No. 9,516,631, issued on Dec. 6, 2016), which is a Continuation of U.S. application Ser. No. 14/098,048, filed on Dec. 5, 2013 (now U.S. Pat. No. 9,094,168, issued on Jul. 28, 2015), which is a Continuation of U.S. application Ser. No. 12/527,680 filed on Aug. 18, 2009 (now U.S. Pat. No. 8,681,716, issued on Mar. 25, 2014), and for which priority is claimed under 35 U.S.C. § 120, application Ser. No. 12/527,680 is the national phase of PCT International Application No. PCT/JP2008/060706 filed on Jun. 11, 2008 under 35 U.S.C. § 371, which claims the benefit of priority of JP2007-155289 filed Jun. 12, 2007. The entire contents of each of the above-identified applications are hereby incorporated by reference.

TECHNICAL FIELD

The present invention relates to a base station device, a mobile station device, a program, an uplink synchronization requesting method, and a synchronization-shift measurement signal transmitting method. Particularly, the present invention relates to a mobile station device, a program, an uplink synchronization requesting method, and a synchronization-shift measurement signal transmitting method for uplink timing synchronization from the mobile station device to the base station device.

Priority is claimed on Japanese Patent Application No. 2007-155289, filed Jun. 12, 2007, the content of which is incorporated herein by reference.

BACKGROUND ART

W-CDMA has been standardized by 3GPP (3rd Generation Partnership Project), and services thereof have been sequentially provided. HSDPA (High Speed Downlink Packet Access) which is a faster communication scheme has been also standardized and services thereof are about to be provided.

Evolved Universal Terrestrial Radio Access (hereinafter, "EUTRA") has been under consideration by 3GPP. OFDM (Orthogonal Frequency Division Multiplexing) has been proposed for EUTRA downlink by 3GPP. DFT (Discrete Fourier Transform)-spread OFDM, which is a single-carrier communication scheme, has been proposed for an EUTRA uplink.

FIG. 15 illustrates an EUTRA uplink-and-downlink channel structure.

An EUTRA downlink includes a DPiCH (Downlink Pilot Channel), a DSCH (Downlink Synchronization Channel), a Downlink Common Control Channel, a PDCCH (Physical Downlink Control Channel) (L1/L2 (Layer 1/Layer 2) Control Channel), and a DL-SCH (Downlink-Shared Channel).

An EUTRA uplink includes a UPiCH (Uplink Pilot Channel), a RACH (Random Access Channel), a UL-SCH (Uplink-Shared Channel), and a PUCCH (Physical Uplink Control Channel) (see Non-Patent Document 1).

FIG. 16 illustrates an example of RACHs and UL-SCHs being allocated to radio resources. In FIG. 16, horizontal and vertical axes denote time and frequency, respectively. FIG. 16 shows a structure of one radio frame which is divided into multiple radio resources. In this case, each radio resource has a region defined by 1.25 MHz in the frequency direction and 1 ms in the time direction. RACHs and UL-SCHs explained in FIG. 15 are allocated to these regions as illustrated. Thus, the minimum unit of a RACH has 1.25 MHz. In FIG. 16, UPiCHs are shatteringly allocated in an UL-SCH region by symbol or subcarrier. Since multiple channels are prepared for RACHs in EUTRA, multiple random accesses are available at the same time. Synchronization between a mobile station device and a base station device is the primary purpose of the use of RACHs. It has also been considered that a few bits of data for requesting a scheduling of a radio resource assignment are transmitted over a RACH to reduce a connection time (see Non-Patent Document 2).

Only a preamble is transmitted over RACH for synchronization. The preamble includes a signature which is a signal pattern indicative of information. From among tens of signatures preliminarily prepared, some signatures are selected to configure a few bits of data. Currently, 6 bits of data are transmitted by signatures in EUTRA. 64 (i.e., 2 to the 6th power) signatures are prepared for 6 bits of data.

A random ID is assigned to 5 bits of 6 bits of signatures. Any of information items concerning a random access reason, a downlink path loss/CQI (Channel Quality Indicator), or the like, is assigned to the remaining 1 bit (see Non-Patent Document 3).

FIG. 17 is a sequence chart illustrating uplink synchronization using RACH. First, a mobile station device selects a signature based on a random ID, a random access reason, a downlink path loss/CQI, or the like, and transmits a preamble including the signature over the RACH (message Ma1). Upon receiving the preamble from the mobile station device, a base station device compares the preamble with a signal pattern preliminarily stored as a preamble to calculate a synchronization timing shift. Then, the base station device performs a scheduling for transmitting an L2/L3 (Layer 2/Layer 3) message, and allocates a C-RNTI (Cell Radio Network Temporary Identifier) to a mobile station device determined to require the C-RNTI based on the random access reason. Then, the base station device transmits a preamble response including synchronization timing shift information, scheduling information, the C-RNTI, and the random ID (message Ma2). The mobile station device extracts the preamble response including the random ID which is transmitted from the base station device, and transmits an L2/L3 message using the scheduled radio resources (message Ma3). Upon receiving the L2/L3 message, the base station device transmits, to the mobile station device, a contention resolution for determining whether or not a collision is occurring between mobile station devices (message Ma4) (see Non-Patent Document 3).

If multiple mobile station devices select the same signature and RACH for random accesses, the random accesses of the mobile station devices collide with one another. A sequence when a collision of random accesses occurs is explained with reference to FIG. 17. If multiple mobile station devices select the same signature and transmit preambles using the same radio resource block having the same time and frequency (i.e., the same RACH), the messages Ma1 collide. If the base station device cannot detect the message Ma1 due to the collision, the base station device cannot transmit a preamble response (message Ma2). Since the mobile station device cannot receive a preamble response (message Ma2) from the base station device, the mobile station device selects a signature and a RACH again after a given time interval, and then performs a random access. On the other hand, if the base station device can detect a preamble (Ma1) in spite of the collision, the base station device calculates a scheduling for an L2/L3 message and a synchronization timing shift, and then transmits a preamble response (message Ma2) to the mobile station devices. However, all the mobile station devices receive the preamble message, and then transmits an L2/L3 message (message Ma3) using the scheduled resource. Consequently, messages Ma3 from the mobile station devices collide. Since the base station device cannot receive the L2/L3 message due to the collision, the base station device cannot transmit a response. Since none of the mobile station devices receives a response to the L2/L3 message, each of the mobile station devices selects a signature again and then performs a random access.

When uplink synchronization between the mobile station device and the base station device is lost (for example, when data has not been received or transmitted for a long period, and the mobile station device is, for a long period, in a DRX (Discontinuous Reception) state for monitoring a downlink resource assignment signal), and when the base station device resumes a downlink data transmission, the mobile station device cannot transmit an ACK/NACK (Acknowledgement/Negative Acknowledgement) which is a reception response for an HARQ (Hybrid Automatic Repeat Request). This is because the uplink synchronization is lost, and therefore a transmission of the ACK/NACK for the HARQ causes an interference with another mobile station device. For this reason, uplink synchronization has to be established using a random access upon a downlink data transmission resuming. However, there is concern that it takes a long time for the downlink data transmission to be resumed if a collision occurs upon the random access. To prevent this, a proposition has been made in which a collision of random accesses upon a downlink data transmission resuming is prevented by, for example, using a signature dedicated to a downlink data transmission resuming.

FIG. 18 is a sequence chart illustrating a method of preventing a collision of random accesses when a downlink data transmission is resumed.

When the base station device decides to resume a downlink data transmission to a mobile station device with which uplink synchronization is lost, the base station device transmits an uplink synchronization request (message Mb1). This uplink synchronization request is transmitted using an L1/L2 (Layer 1/Layer 2) control channel. The uplink synchronization request includes the signature ID number of a random access to be performed by the mobile station device. This is called a dedicated signature. The mobile station device performs a random access (i.e., transmits a preamble) using the dedicated signature included in the received uplink synchronization request (message Mb2). Upon receiving the preamble including the dedicated signature, the base station device detects a synchronization timing shift based on the preamble. Then, the base station device transmits, as a preamble response, a TA (Timing Advance) command indicative of the synchronization timing shift (message Mb3). After the base station transmits the TA command, the base station device transmits an L1/L2 control channel including a downlink resource assignment (message Mb4), and then resumes a downlink data transmission (message Mb5) (see Non-Patent Document 4).

Non-Patent Document 1: R1-050850 "Physical Channel and Multiplexing in Evolved UTRA Uplink", 3GPP TSG RAN WG1 Meeting #42 London, UK, Aug. 29-Sep. 2, 2005

Non-Patent Document 2: 3GPP TR (Technical Report) 25.814, V7.0.0 (2006-06), Physical layer aspects for evolved Universal Terrestrial Radio Access (UTRA)

Non-Patent Document 3: 3GPP TS (Technical Specification) 36.300, V0.90 (2007-03), Evolved Universal Terrestrial Radio Access (E-UTRA) and evolved Universal Terrestrial Radio Access Network (E-UTRAN), Overall description Stage 2

Non-Patent Document 4: R2-062165 "UL Synchronization", 3GPP TSG RAN WG2 Meeting #54 Tallinn, 28 Aug. 1-Sep. 2006

DISCLOSURE OF THE INVENTION

Problems to be Solved by the Invention

In the method of resuming a downlink data transmission to prevent a collision of random accesses as explained above, an uplink synchronization request is transmitted using a PDCCH (L1/L2 control channel) requiring no ACK/NACK for the HARQ. The PDCCH is a channel for transmitting, between the base station device and the mobile station device, adaptive modulation parameters for transmitting and receiving user data, or channel allocation information. For this reason, a PDCCH is allocated to a fixed position of a radio resource and frequently transmitted.

A problem to be solved is that utilization efficiency of radio resources degrades if a region to which an uplink synchronization request which does not occur so often is allocated is saved in a PDCCH which is frequently transmitted.

Means for Solving the Problems

A mobile station device of the present invention is included in a mobile communication system. The mobile station device includes: a receiver that receives, from a base station device, a physical downlink control channel including a region to which radio resource assignment information is set; and a transmitter that transmits, to the base station device, a random access preamble, when detecting information to order the random access from a predetermined region of the physical downlink control channel. The predetermined region includes the region to which the radio resource assignment information is set.

A base station device of the present invention is included in a mobile communication system. The base station device includes: a transmitter that transmits, to a mobile station device, a physical downlink control channel including a region to which radio resource assignment information is set; and a detector that detects a random access preamble, the preamble being transmitted from the mobile station device. The transmitter includes, when ordering the random access to the mobile station, information to order the random access in a predetermined region of the physical downlink control channel to be transmitted to the mobile station device. The predetermined region includes the region to which the radio resource assignment information is set.

A processing method of the present invention is provided for a mobile station device included in a mobile communication system. The processing method includes: receiving, from a base station device, a physical downlink control channel including a region to which radio resource assignment information is set; and transmitting, to the base station device, a random access preamble, when detecting information to order the random access from a predetermined region of the physical downlink control channel. The predetermined region includes the region to which the radio resource assignment information is set.

A processing method of the present invention is provided for a base station device included in a mobile communication system. The processing method includes: transmitting, to a mobile station device, a physical downlink control channel including a region to which radio resource assignment information is set; and detecting a random access preamble, the preamble being transmitted from the mobile station device. Transmitting the physical downlink control channel includes including, when ordering the random access to the mobile station, information to order the random access in a predetermined region of the physical downlink control channel to be transmitted to the mobile station device. The predetermined region includes the region to which the radio resource assignment information is set.

Effects of the Invention

The base station device of the present invention allocates information indicative of an uplink synchronization request addressed to the mobile station device to a region in a radio frame where parameters used for synchronous communication between the base station and the mobile station device are set. Accordingly, the uplink synchronization request can be allocated to achieve an excellent utilization efficiency of radio resources.

Figure 1:
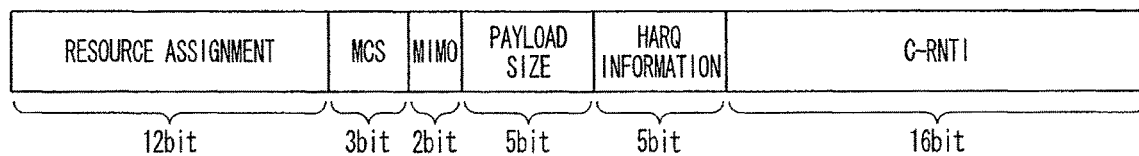
FIG. 1 illustrates a format of downlink control information to be transmitted to a mobile station device with which uplink synchronization is maintained according to an embodiment of the present invention.

DESCRIPTION OF REFERENCE NUMERALS 10 data controller
11 OFDM modulator
12 scheduler
13 channel estimator
14 DFT-S-OFDM modulator
15 control data extractor
16 preamble detector
17 signature managing unit
19 radio unit
20 DL scheduler
21 UL scheduler
30 upper layer unit
50 data controller
51 DFT-S-OFDM modulator
52 scheduler
53 OFDM demodulator
54 channel estimator
55 control data extractor
56 synchronization aligner
57 preamble generator
58 signature selector
59 radio unit
60 upper layer unit

BEST MODE FOR CARRYING OUT THE INVENTION

Hereinafter, an embodiment of the present invention is explained with reference to accompanying drawings. A radio communication system of the embodiment includes a base station device and multiple mobile station devices, similarly to EUTRA. In the embodiment, an "uplink" indicates communication connection from the mobile station device to the base station device. Additionally, a "downlink" indicates a communication connection from the base station device to the mobile station device. The downlink of the embodiment includes the DPiCH, the DSCH, the downlink common control channel, the PDCCH (L1/L2 (Layer 1/Layer 2)

control channel), and the DL-SCH. The uplink of the embodiment includes the UPiCH, the RACH, and the UL-SCH.

RACH is an uplink channel having a guard time. For this reason, even if a mobile station device transmits RACH to the base station device with which uplink timing synchronization is not maintained, and if a synchronization shift is within the guard time, the transmission of the RACH is enabled without causing an interference with another channel. A signature to be included in a preamble to be transmitted over the RACH can be selected from 64 signatures. The mobile station device selects one of the 64 signatures and includes the selected signature in a preamble.

The PDCCH (L1/L2 control channel) is allocated a fixed region in each radio frame. The fixed region for downlink control differs from that for uplink control. Downlink control information and uplink control information for each mobile station device are allocated to the downlink control region and the uplink control region, respectively.

A mobile station device receives information addressed to the mobile station device from the control information transmitted from the base station device. The control information includes parameters to be used for data communication (synchronous communication) between the base station device and the mobile station device, such as resource assignment information for each mobile station device (i.e., regions in a radio frame defined by frequency and time), adaptive modulation parameters, the HARQ, or the like.

FIG. 1 illustrates a format of downlink control information to be transmitted to the mobile station device with which uplink synchronization is maintained. As shown in FIG. 1, the downlink control information includes downlink resource assignment information (12 bits for indicating positions of resources allocated in downlink to the mobile station device), MCS (Modulation and Coding Scheme) information (3 bits for specifying a modulation scheme or an encoding scheme), MIMO (Multiple Input Multiple Output) information (2 bits for specifying the number of antennas), the payload size (5 bits which is the size of payload included in a resource allocated in downlink), HARQ information (5 bits), and C-RNTI (Cell specific Radio Network Temporary Identity) (16 bits which is identification information for the base station to identify a mobile station device). CRC (Cyclic Redundancy Check) for the downlink control information is shared with the C-RNTI. In other words, if CRC is calculated for downlink control information including the C-RNTI region, a calculated value becomes the value of C-RNTI. The mobile station device calculates CRC for each downlink control information item, and determines whether or not the downlink control information is addressed to the mobile station device based on whether or not the result of the CRC matches the value of C-RNTI.

Figure 2:
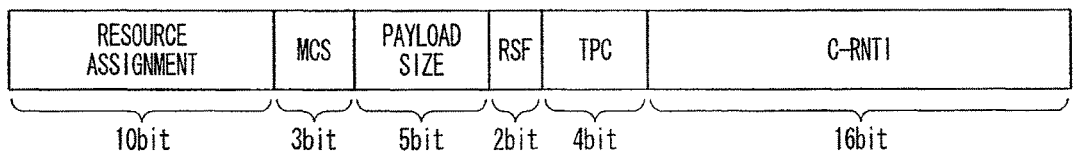
FIG. 2 illustrates a format of uplink control information to be transmitted to the mobile station device with which uplink synchronization is maintained according to the embodiment.

FIG. 2 illustrates a format of uplink control information to be transmitted to the mobile station device with which uplink synchronization is maintained. As shown in FIG. 2, the uplink control information includes uplink resource assignment information (10 bits for specifying positions of resources allocated in uplink to a mobile station device), MCS information (3 bits for specifying a modulation scheme or an encoding scheme), the payload size (5 bits which is the size of payload included in a resource allocated in downlink), RSF (reference signal Format) (2 bits which is a transmission format of a reference signal), TPC (Transmission Power Control) (4 bits for indicating a transmission power), and C-RNTI. CRC of the uplink control information is shared with C-RNTI. In other words, similar to the downlink control information shown in FIG. 1, whether or not the uplink control information is addressed to the mobile station device is determined based on whether or not the calculated value of CRC matches the value C-RNTI of the mobile station device.

Figure 3:
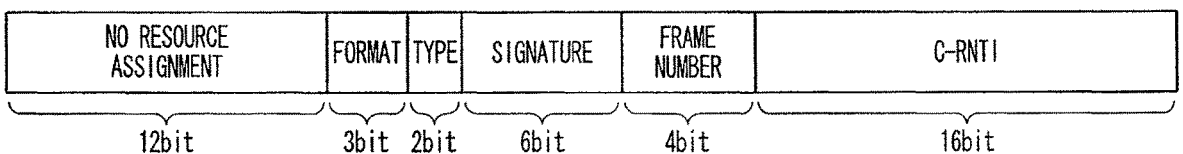
FIG. 3 illustrates a format of downlink control information including an uplink synchronization request according to the embodiment.

FIG. 3 illustrates a format of downlink control information including an uplink synchronization request, which is transmitted when uplink re-synchronization is necessary, that is, when an uplink re-synchronization factor is detected. As shown in FIG. 3, information indicative of "no resource assignment" is allocated to the first 12 bits to which resource assignment information is allocated when synchronization is maintained. Upon detecting the information indicative of "no resource assignment", the mobile station device determines that the downlink control information indicates an uplink synchronization request. After the region indicating "no resource assignment", 3 bits of a reserve region is allocated. When information other than an uplink synchronization request can be transmitted by downlink control information, a value for identifying information to be transmitted may be allocated to the reserve region.

2 bits of data indicating a type of signature is allocated to a "type" region positioned after the reserve region. The type of signature indicates a dedicated signature or a random signature. The dedicated signature is a signature to be used for a random access performed by only a mobile station device specified by the uplink synchronization request transmitted from the base station device. 6 bits of data for specifying the signature ID number when the type of the signature is a dedicated signature is allocated to a "signature" region positioned after the "type" region. 4 bits of data for specifying a radio frame region where the signature ID number specified by the "signature" region can be used is allocated to a "frame number" region positioned after the "signature" region. If a validity period or the like is preliminarily defined by specification, an available radio frame region does not have to be specified. Similar to the case where uplink synchronization is maintained, the "C-RNTI" region positioned after the "frame number" region is a region for specifying identification information concerning a mobile station device targeted by the downlink control information. 16 bits of data serving as CRC are allocated to the "C-RNTI" region. Similar to the downlink control information shown in FIG. 1, whether or not the information is addressed to the mobile station device is determined based on whether or not a calculated value of CRC matches the value of C-RNTI of the mobile station device.

As shown in FIGS. 1 and 3, the downlink control information to be transmitted when uplink synchronization is maintained has the same bit number as the downlink control information to be transmitted when uplink re-synchronization is required and an uplink synchronization request is required to be included. The predetermined number of downlink control information items as shown in FIGS. 1 and 3 are allocated to a downlink control region of PDCCH. The number of information items shown in FIG. 1 when uplink synchronization is maintained and the number of information items shown in FIG. 3 when an uplink synchronization request is transmitted are determined according to a communication condition. In other words, downlink control information, which is used when uplink re-synchronization is required and an uplink synchronization request is transmitted, is allocated to a region to which downlink control information used when uplink synchronization is maintained is allocated.

Figure 4:
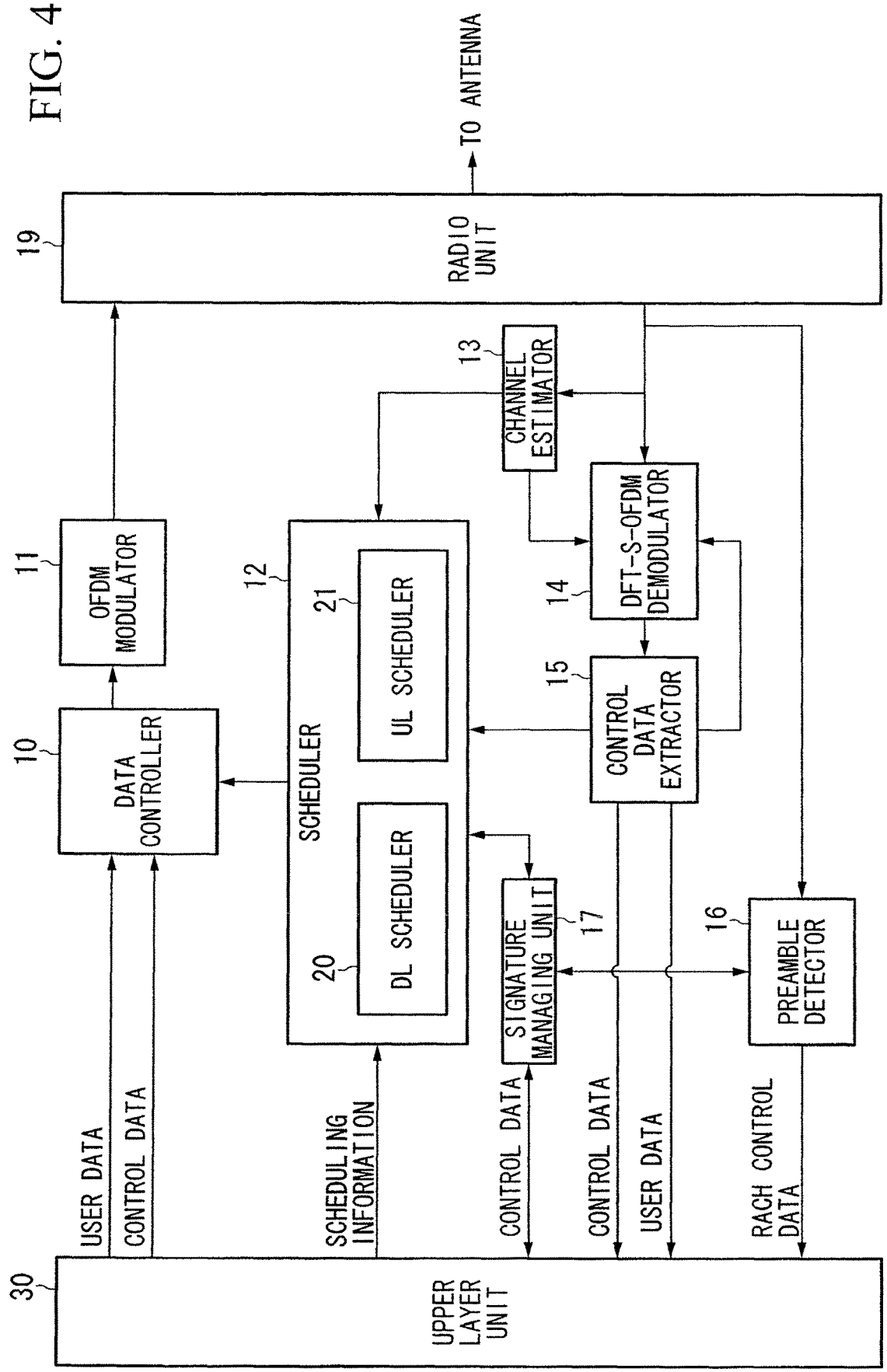
FIG. 4 is a schematic block diagram illustrating a configuration of a base station device according to the embodiment.

FIG. 4 is a schematic block diagram illustrating a structure of the base station. The base station includes a data controller 10, an OFDM modulator 11, a scheduler 12, a channel estimator 13, a DFT-S-OFDM demodulator 14, a control data extractor 15, a preamble detector 16, a signature managing unit 17, a radio unit 19, and an upper layer unit 30. The scheduler 12 includes a DL scheduler 20 and a UL scheduler 21. In the embodiment, each of the channel estimator 13 and the UL scheduler 21 functions as a re-synchronization factor detector that detects an uplink re-synchronization factor of each mobile station device. The OFDM modulator 11 and the radio unit 19 function as a transmitter. The data controller 10 receives user data and control data from the upper layer unit 30. Based on an instruction from the scheduler 12, the data controller 10 maps the control data to the downlink common control channel, the DSCH, the DPiCH, and the PDCCH. Additionally, the data controller 10 maps transmission data to be transmitted to each mobile station device to the DL-SCH. Further, the data controller 10 receives uplink control information and downlink control information from the scheduler 12, and maps the received information to the PDCCH. In other words, the OFDM modulator 11 performs, on the data mapped by the data controller 10 to each channel, OFDM signal processing, such as data modulation, a serial to parallel conversion, an IFFT (Inverse Fast Fourier Transform), a CP (Cyclic Prefix) insertion, a filtering, and the like, to generate an OFDM signal. The radio unit 19 upconverts the OFDM signal generated by the OFDM modulator 11 into a radio frequency signal, and transmits the converted signal to the mobile station device through an antenna.

The radio unit 19 receives an uplink signal from a mobile station device through the antenna. Then, the radio unit 19 downconverts the received signal into a baseband signal, and then outputs the baseband signal to the DFT-S-OFDM demodulator 14, the channel estimator 13, and the preamble detector 16. The channel estimator 13 estimates radio channel characteristics from the UPiCH included in the received signal, and outputs an estimation result to the DFT-S-OFDM demodulator 14. The channel estimator 13 outputs the estimation result to the scheduler 12 for an uplink scheduling. Further, the channel estimator 13 detects an uplink synchronization shift and reports the detected uplink synchronization shift to the scheduler 12 when uplink synchronization is necessary. Although a single carrier scheme, such as DFT-spread OFDM, is considered as the uplink communication scheme, a multicarrier scheme, such as OFDM, may be used.

The DFT-S-OFDM demodulator 14 demodulates the reception signal received from the radio unit 19 using the radio channel characteristics received from the channel estimator 13, the resource assignment information, information concerning adaptive modulation parameters, and the like, which are received from the control data extractor 15. Thus, the DFT-S-OFDM demodulator 14 obtains reception data. The control data extractor 15 divides the reception data into user data (UL-SCH) and control data (PUCCH). The control data extractor 15 outputs downlink CQI information included in the control data to the scheduler 12, and outputs the other control data and the user data to the upper layer unit 30.

As explained above, the scheduler 12 includes the DL scheduler 20 that performs downlink scheduling and the UL scheduler 21 that performs uplink scheduling. The DL scheduler 20 performs a scheduling for mapping user data to each downlink channel based on the CQI information indicated by a mobile station device and scheduling information included in each user data which is indicated by the upper layer unit 30. Based on a scheduling result, the DL scheduler 20 generates downlink control information shown in FIG. 1 to be transmitted to a mobile station device with which synchronization is maintained, and outputs the generated downlink control information to the data controller 10. The UL scheduler 21 performs a scheduling for mapping user data to each uplink channel based on the uplink radio channel estimation result received from the channel estimator 13 and the resource assignment request received from the mobile station device. Based on a scheduling result, the UL scheduler 21 generates uplink control information shown in FIG. 2 to be transmitted to a mobile station device with which synchronization is maintained, and outputs the generated uplink control information to the data controller 10.

The UL scheduler 21 manages uplink synchronization conditions of each mobile station device using a timer, and detects, as an occurrence of an uplink re-synchronization factor, a mobile station device to/from which data has not been transmitted/received for a given time period. With respect to the mobile station device requiring uplink re-synchronization which is detected using the timer and the mobile station device requiring uplink re-synchronization which is detected by the channel estimator 13, the UL scheduler 21 indicates a detection of the uplink re-synchronization factor to the upper layer unit 30. At the same time, the UL scheduler 21 generates downlink control information including an uplink synchronization request for each of the mobile station devices, and outputs the generated downlink control information to the data controller 10. Upon generating the downlink control information including the uplink synchronization request, the UL scheduler 21 obtains the signature ID number of an available dedicated signature from the signature managing unit 17, and stores the obtained signature ID number in the downlink control information. At the same time, the UL scheduler 21 registers, in the signature managing unit 17, information for identifying a mobile station device that uses the signature ID number and the number of a radio frame to be used.

The preamble detector 16 detects a preamble that is a synchronization shift measurement signal from the reception signal received from the radio unit 19, and calculates a synchronization timing shift. The preamble detector 16 indicates the signature ID number (measurement signal identification information) obtained from the detected preamble, and indicates the calculated synchronization timing shift to the upper layer unit 30. If the obtained signature ID number corresponds to the signature indicated from the signature managing unit 17, the preamble detector 16 sets 1 to the dedicated signature flag. If the obtained signature ID number does not correspond to the signature indicated from the signature managing unit 17, the preamble detector 16 sets 0 to the dedicated signature flag. Additionally, if the obtained signature ID number corresponds to the signature indicated from the signature managing unit 17, the preamble detector 16 indicates to the signature managing unit 17 that the preamble including the indicated signature ID number has been detected.

Based on an instruction from the UL scheduler 21, the signature managing unit 17 selects a dedicated signature and indicates the ID number of the selected dedicated signature to the UL scheduler 21. Additionally, the signature managing unit 17 indicates the selected signature to the preamble detector 16. Upon selecting a dedicated signature, the signature managing unit 17 confirms the signature ID number of the dedicated signature in use, and selects one from dedicated signatures not in use. The signature managing unit 17 registers the ID number of the selected signature as one in use, and deletes the signature detected by the preamble detector 16 from stored information. The upper layer unit 30 controls the base station device based on a process as will be explained later with reference to FIGS. 6 to 11.

Figure 5:
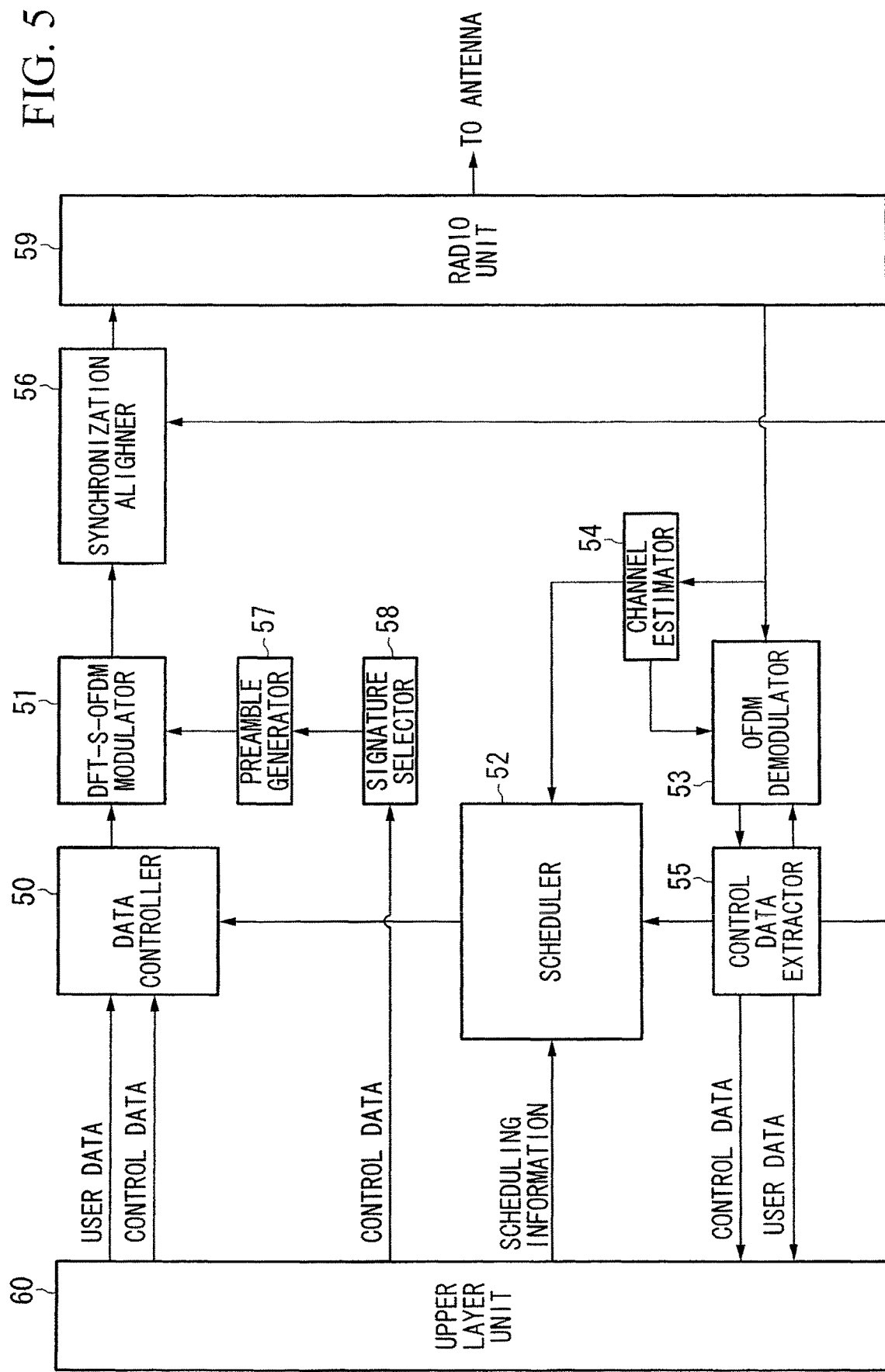
FIG. 5 is a schematic block diagram illustrating a configuration of a mobile station device according to the embodiment.

FIG. 5 is a schematic block diagram illustrating a configuration of a mobile station device. The mobile station device includes a data controller 50, a DFT-S-OFDM modulator 55, a scheduler 52, an OFDM demodulator 53, a channel estimator 54, a control data extractor 55, a synchronization aligner 56, a preamble generator 57, a signature selector 58, a radio unit 59, and an upper layer unit 60.

User data and control data are input to the data controller 50, and mapped to the UL-SCH based on an instruction from the scheduler 52. The DFT-S-OFDM modulator 51 performs, on the data mapped by the data controller 50, DFT-S-OFDM signal processing, such as data modulation, a DFT conversion, a subcarrier mapping, an IFFT conversion, a CP (Cyclic Prefix) insertion, a filtering, and the like. Thus, the DFT-S-OFDM modulator 51 generates a DFT-Spread-OFDM signal. Although a single carrier scheme, such as DFT-spread OFDM, is considered as the uplink communication scheme, a multicarrier scheme, such as OFDM, may be used. The synchronization aligner 56 determines a transmission timing based on the synchronization information received from the control data extractor 55. Then, the synchronization aligner 56 outputs the DFT-Spread-OFDM signal received from the DFT-Spread-OFDM modulator 51 to the radio unit 59 in time for the transmission timing. The radio unit 59 sets a radio frequency to a value specified by the radio controller, upconverts the DFT-Spread-OFDM signal received from the synchronization aligner 56 into a radio frequency signal, and transmits the radio frequency signal to the base station device through an antenna.

The radio unit 59 receives a downlink signal from the base station device through the antenna, downconverts the received signal into a baseband signal, and outputs the baseband signal to the OFDM modulator 53 and the channel estimator 54. The channel estimator 54 estimates radio channel characteristics from the DPiCH included in the signal received from the radio unit 59, and outputs an estimation result to the OFDM demodulator 53 and the scheduler 52. To indicate the radio channel characteristics estimation result to the base station device, the channel estimator 54 converts the estimation result into CQI (Channel Quality Indicator) information, and outputs the CQI information to the data controller 50. The OFDM demodulator 53 demodulates the baseband signal received from the radio unit 59 using the radio channel characteristics estimation result, and thus obtains reception data. The control data extractor 55 divides the reception data into user data and control data.

The control data extractor 55 extracts uplink control information addressed to the mobile station device from the divided control data, and outputs the uplink control information to the scheduler 52. Further, the control data extractor 55 extracts uplink synchronization information addressed to the mobile station device, and outputs the uplink synchronization information to the synchronization aligner 56. The control data extractor 55 extracts downlink control information addressed to the mobile station device from the divided control data. If the extracted downlink control information is addressed to the mobile station device with which uplink synchronization is maintained, the control data extractor 55 instructs the OFDM demodulator 53 to demodulate, from the baseband signal, the user data and the control data specified by the resource assignment included in the downlink control information based on a modulation scheme specified by the adaptive modulation parameters included in the downlink control information. On the other hand, if the downlink control information addressed to the mobile station device includes an uplink synchronization request, the control data extractor 55 outputs the downlink control information to the upper layer unit 60 for transmitting a synchronization shift measurement signal based on the downlink control information. Additionally, the control data extractor 55 outputs the control data and the user data other than the above downlink control information to the upper layer unit 60. Referring to the resource assignment region of the downlink control information, the control data extractor 55 determines whether the downlink control information is addressed to the mobile station device with which uplink synchronization is maintained or the downlink control information includes an uplink synchronization request. If allocated resources are specified, the control data extractor 55 determines that the downlink control information is addressed to the mobile station device with which uplink synchronization is maintained. If there is no allocated resource, the control data extractor 55 determines that the downlink control information includes an uplink synchronization request.

The signature selector 58 selects the signature ID number to be used for a random access based on an instruction from the upper layer unit 60, and outputs the selected signature ID number to the preamble generator 57. The preamble generator (measurement signal generator) 57 generates a preamble (synchronization shift measurement signal), and outputs the generated preamble to the DFT-S-OFDM modulator 51. The scheduler 52 performs MAC control to control data transmission and/or reception using the resources specified by the base station. Additionally, the scheduler 52 manages uplink synchronization conditions of each mobile station device using a timer. The upper layer unit 60 controls the mobile station device based on a process as will be explained layer with reference to FIGS. 6 to 12.

Figure 6:
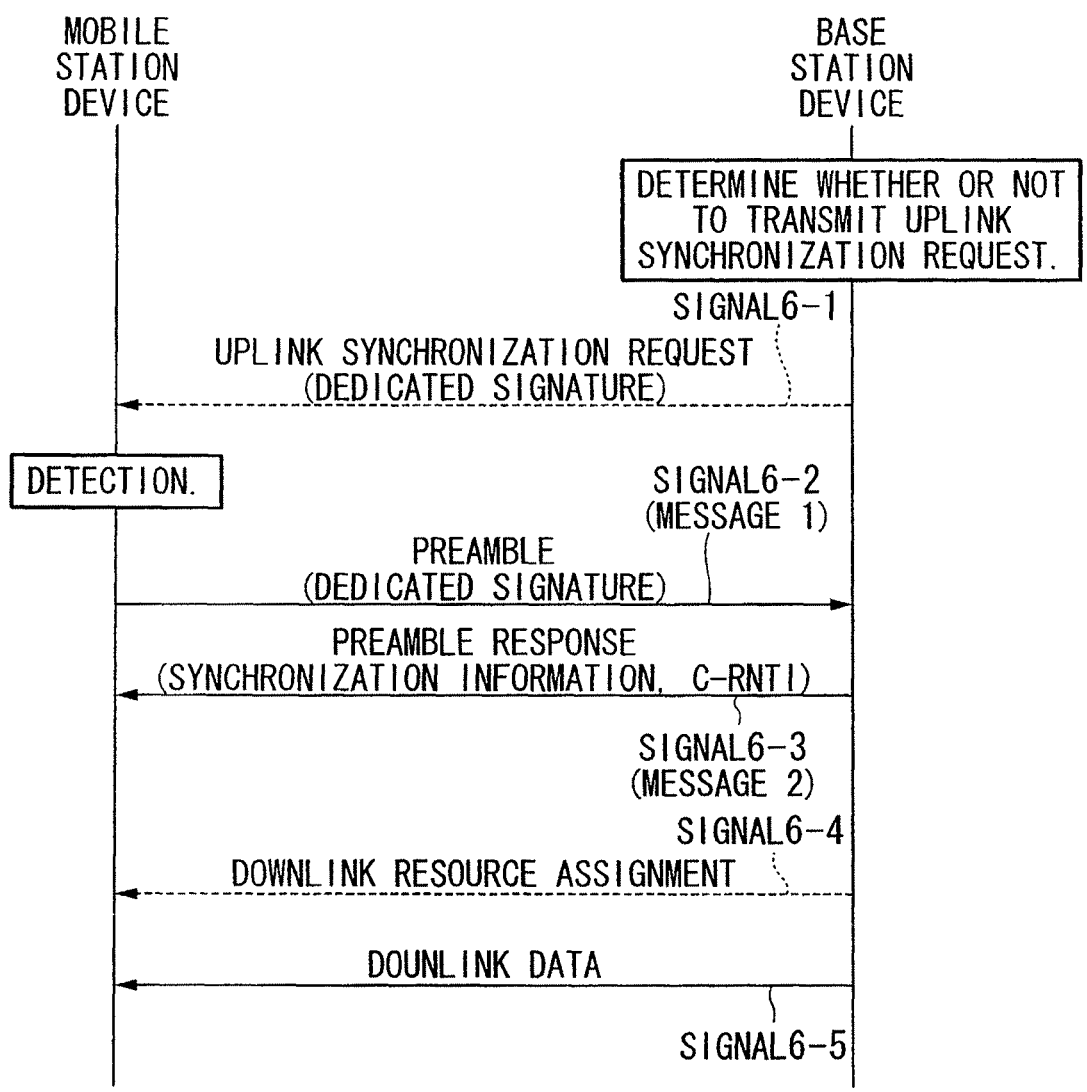
FIG. 6 is a sequence chart illustrating a process of the base station device when transmitting an uplink synchronization request including a dedicated signature.
Figure 7:
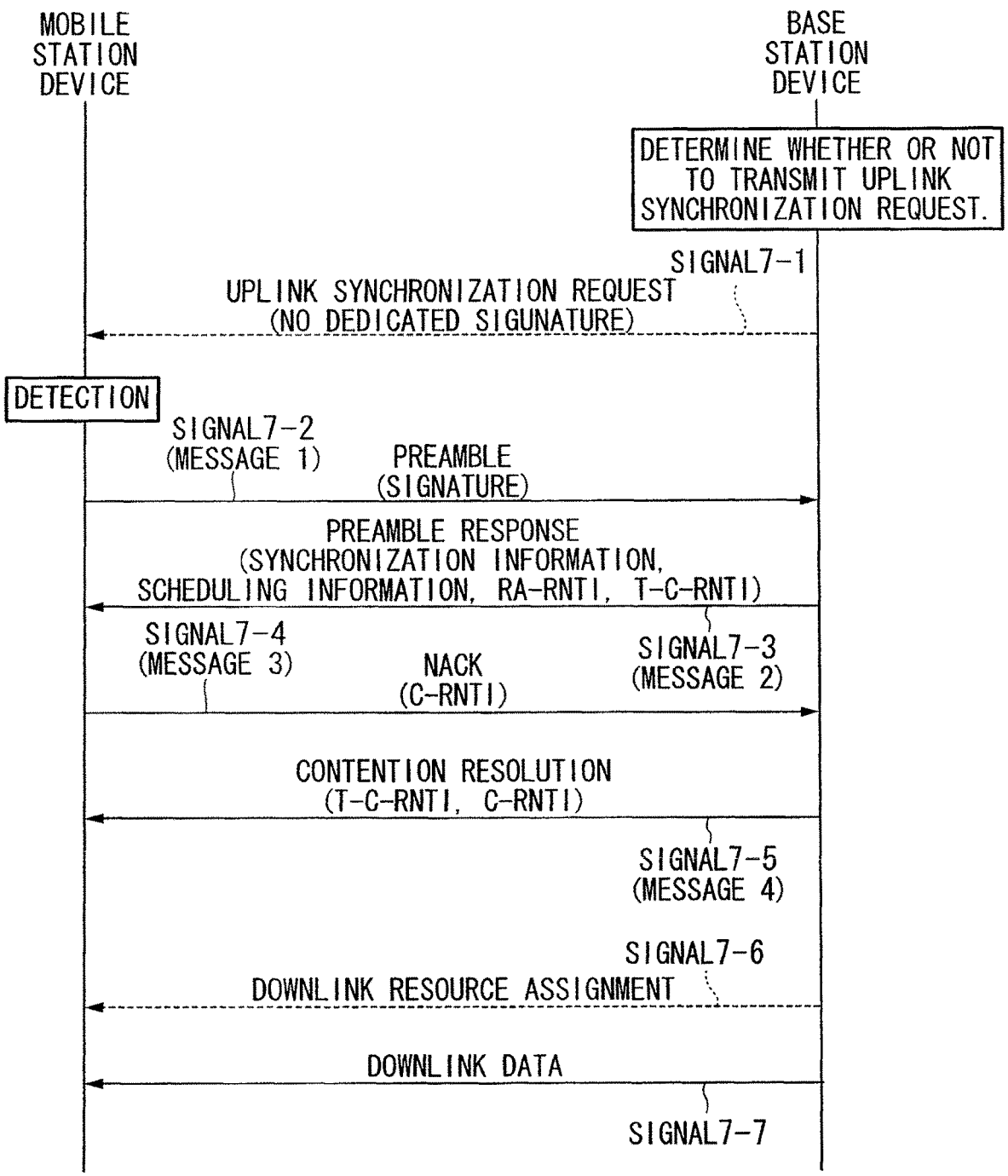
FIG. 7 is a sequence chart illustrating a process of the base station device of the embodiment when transmitting an uplink synchronization request not including the dedicated signature.
Figure 8:
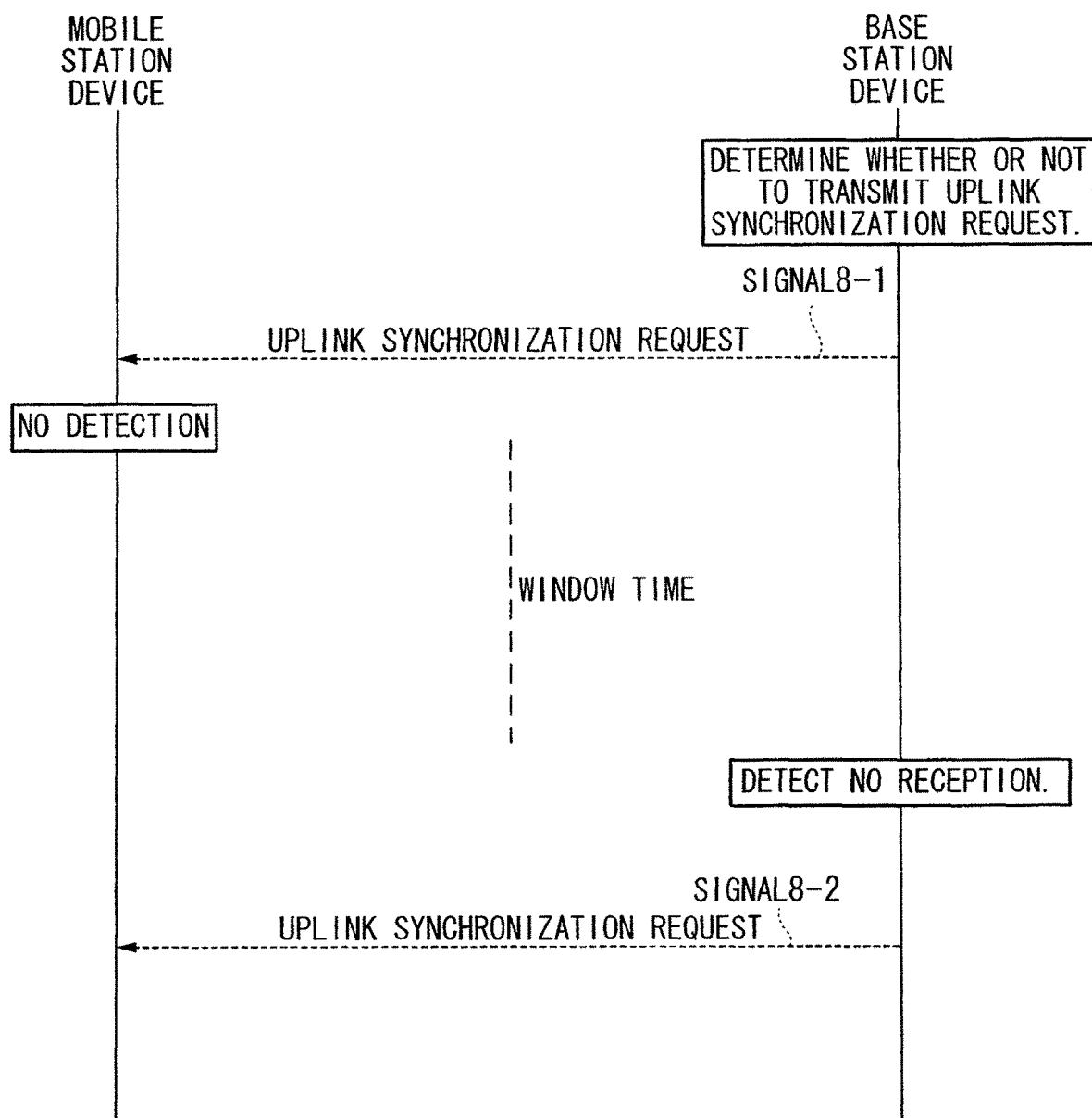
FIG. 8 is a sequence chart illustrating a process of the mobile station device of the embodiment when a CRC for PDCCH fails.

In the embodiment, upon transmitting an uplink synchronization request to a mobile station device requiring an uplink re-synchronization, the base station device transmits an uplink synchronization request over the PDCCH. If a dedicated signature is included in the uplink synchronization request, the mobile station device transmits a RACH using the dedicated signature without a contention. The details are explained hereinafter. FIG. 6 illustrates a process of the base station device transmitting an uplink synchronization request including a dedicated signature. FIG. 7 illustrates a process of the base station device transmitting an uplink synchronization request in which a random signature is specified. FIG. 8 illustrates a process of the mobile station device when the mobile station device cannot receive a PDCCH including an uplink synchronization request.

FIG. 6 is a sequence chart illustrating a process of the base station device transmitting an uplink synchronization request including a dedicated signature. The base station device manages uplink synchronization with mobile station devices. The UL scheduler 21 of the base station device sets a timer. If an uplink transmission has not been performed for a given time period, or if uplink synchronization information has not been updated for a given time period, the UL scheduler 21 determines that an uplink re-synchronization factor occurs. If the channel estimator 13 receives uplink transmission data or a transmission signal from a mobile station device and detects a reception timing shift, the channel estimator 13 determines that an uplink re-synchronization factor occurs. The base station device transmits an uplink synchronization request upon detecting an arrival of data (transmission data and reception data) addressed to the mobile station device requiring a re-synchronization, that is, the mobile station device for which it is determined that an uplink re-synchronization factor occurs. Alternatively, the base station device transmits an uplink synchronization request to the mobile station device upon determining that uplink synchronization with the mobile station device for which it is determined that an uplink re-synchronization factor occurs is to be maintained. The UL scheduler 21 generates downlink control information including an uplink synchronization request. Then, the data controller 10 maps the generated downlink control information to the PDCCH to be transmitted (signal 6-1). The uplink synchronization request has the format shown in FIG. 3. The uplink synchronization request includes the signature ID number for specifying the dedicated signature that the UL scheduler 21 has obtained from the signature managing unit 17. The signature ID number and the C-RNTI of the mobile station device which is the transmission destination are correlated and stored in the signature managing unit 17.

The control data extractor 55 of the mobile station device calculates a CRC for each downlink control information item of the PDCCH to find one identical to the value of C-RNTI of the mobile station device. Thus, the control data extractor 55 detects that the downlink control information addressed to the mobile station device is correctly received. Since "no resource assignment" is set to resource assignment information included in the downlink control information, the control data extractor 55 detects that the downlink control information indicates an uplink synchronization request. Upon receiving the uplink synchronization request, the upper layer unit 60 indicates the signature ID number and the frame number which are specified by the uplink synchronization request to the signature selector 58. The signature selector 58 selects a dedicated signature corresponding to the specified signature ID number, and then indicates the dedicated signature and the specified frame number to the preamble generator 57. The preamble generator 57 generates a preamble of the indicated dedicated signature. Then, the DFT-S-OFDM modulator 51 transmits the preamble using a RACH included in a radio frame corresponding to the specified frame number (signal 6-2: message 1).

When the preamble detector 16 of the base station device detects the preamble on the RACH, the upper layer unit 30 generates a preamble response to the preamble, and transmits the generated preamble response (signal 6-3: message 2). At this time, the upper layer 30 of the base station device compares the dedicated signature detected from the preamble to the information registered in the signature managing unit 17, and thereby can identify the mobile station device that has transmitted the detected preamble. The upper layer unit 30 obtains C-RNTI that is the identification information concerning the identified mobile station device from the signature managing unit 17. The data controller 10 maps the preamble response to PDCCH and DL-SCH. The information mapped to the PDCCH includes RA-RNTI (Random Access-Radio Network Temporary Identity) for identifying the preamble response or C-RNTI for directly specifying a mobile station device. The information mapped to the DL-SCH includes synchronization information indicative of a synchronization shift alignment amount.

When the RA-RNTI is used, the dedicated signature or C-RNTI is included in the DL-SCH. The control data extractor 55 of the mobile station device detects the dedicated signature or the C-RNTI, and thereby detects the preamble response addressed to the mobile station device. The control data extractor 55 extracts the synchronization information from the preamble response, and indicates the synchronization shift alignment amount specified by the synchronization information to, the synchronization aligner 56. Then, the base station device resumes a normal data transmission (signal 6-4 and signal 6-5).

FIG. 7 is a sequence chart illustrating a process of the base station device when the base station device does not transmit a dedicated signature. The base station device manages uplink synchronization with the mobile station device. The UL scheduler 21 of the base station device sets a timer. If an uplink transmission has not been performed for a given time period or if uplink synchronization information has not been updated for a given time period, the UL scheduler 21 determines that an uplink re-synchronization factor occurs. Alternatively, when the channel estimator 13 receives uplink transmission data or a transmission signal from a mobile station device and detects a reception timing shift, the channel estimator 13 determines that an uplink re-synchronization factor occurs. When the base station device detects an arrival of data (transmission data and reception data) addressed to a mobile station device requiring uplink re-synchronization, or when the base station device determines that uplink synchronization is to be maintained with the mobile station device requiring uplink-resynchronization, the base station device transmits an uplink synchronization request. The UL scheduler 21 generates downlink control information including an uplink synchronization request and maps the generated information to PDCCH to be transmitted (signal 7-1). Upon the uplink synchronization request, a random signature is set to the "type" region, which indicates that a dedicated signature is not allocated.

The control data extractor 55 of the mobile station device calculates a CRC for each downlink control information item of the PDCCH to find one identical to the value of C-RNTI of the mobile station device. Thus, the control data extractor 55 detects that the downlink control information addressed to the mobile station device is surely received. Since "no resource assignment" is set to resource assignment information included in the downlink control information, the control data extractor 55 detects that the downlink control information indicates an uplink synchronization request. Upon receiving the uplink synchronization request, the upper layer unit 60 instructs the signature selector 58 to select a signature. The signature selector 58 randomly selects a signature corresponding to the signature ID number excluding the dedicated signature, and then instructs the preamble generator 57 to generate a preamble including the selected signature. The preamble generator 57 generates a preamble including the specified signature. Then, the DFT-S-OFDM modulator 51 transmits the generated preamble using. RACH (signal 7-2: message 1).

When the preamble detector 16 of the base station device detects the preamble over the RACH, the upper layer unit 30 generates a preamble response to the detected preamble, and transmits the generated preamble response (signal 7-3: message 2). At this time, the upper layer 30 of the base station device cannot identify a mobile station device by detecting a signature. The data controller 10 maps the preamble response to PDCCH and DL-SCH. The PDCCH includes a RA-RNTI for identifying the preamble response. The DL-SCH includes mapping information concerning synchronization information and a signature, mapping information concerning a signature and a new C-RNTI (T-C-RNTI), and scheduling information for the mobile station device transmitting a message 3 that is a response to the message 2.

At this time, the base station device cannot recognize why the mobile station device has performed the random access to the base station device. The mobile station device transmits the message 3 based on the scheduling information included in the message 2 (signal 7-4: message 3). A C-RNTI for identifying the mobile station device that is the transmission source is included in the message 3. Upon receiving the message 3 including the C-RNTI, the base station device detects that the message 3 is the response from the mobile station device specified by the signal 7-1 since the message 3 has been transmitted based on the previously transmitted scheduling information. The base station device transmits a contention resolution as information for preventing a collision when each of multiple mobile station devices transmits the preamble of the message 1 corresponding to the message 3 using the same signature (signal 7-5: message 4). The new mobile station device identification information T-C-RNTI specified in the message 2 by the base station device is included in the PDCCH to which the message 4 is allocated. The mobile station device identification information detected from the message 3 by the base station device is included in the DL-SCH. Then, the base station device resumes normal data transmission (signals 7-6 and 7-7).

FIG. 8 is a sequence chart illustrating a process of the mobile station device when a CRC for the PDCCH fails. The base station device manages uplink synchronization with mobile station devices by, for example, setting a time. If an uplink transmission has not been performed for a given time period, or if uplink synchronization information has not been updated for a given time period, the base station device determines that an uplink re-synchronization factor occurs. Alternatively, if the base station device receives uplink transmission data or a transmission signal from a mobile station device and detects a reception timing shift, the base station device determines that an uplink re-synchronization factor occurs. When the base station device detects an arrival of data (transmission data and reception data) addressed to the mobile station device requiring re-synchronization, or when the base station device determines that uplink synchronization is to be maintained with the mobile station device requiring uplink re-synchronization, the base station device transmits an uplink synchronization request to the mobile station device. The uplink synchronization request is transmitted over the PDCCH (signal 8-1).

The control data extractor 55 of the mobile station device calculates a CRC for each downlink control information item of the PDCCH to find one identical to the value of C-RNTI of the mobile station device. However, it is assumed here that the downlink control information cannot be correctly received due to a bad reception condition of the mobile station device and the calculated CRC does not match the value of C-RNTI. Since the uplink synchronization request cannot be detected, the mobile station device suspends a reception until the next reception cycle, and performs a reception of PDCCH. If the base station device does not receive a response from the mobile station device within a given window time (a response method differs according to conditions of FIGS. 6 and 7), the base station device detects that the mobile station device could not receive the uplink synchronization request. Upon detecting no reception from the mobile station device, the base station device waits for the next transmission cycle, and then transmits an uplink synchronization request to the mobile station device requiring uplink re-synchronization, again (signal 8-2).

Figure 9:
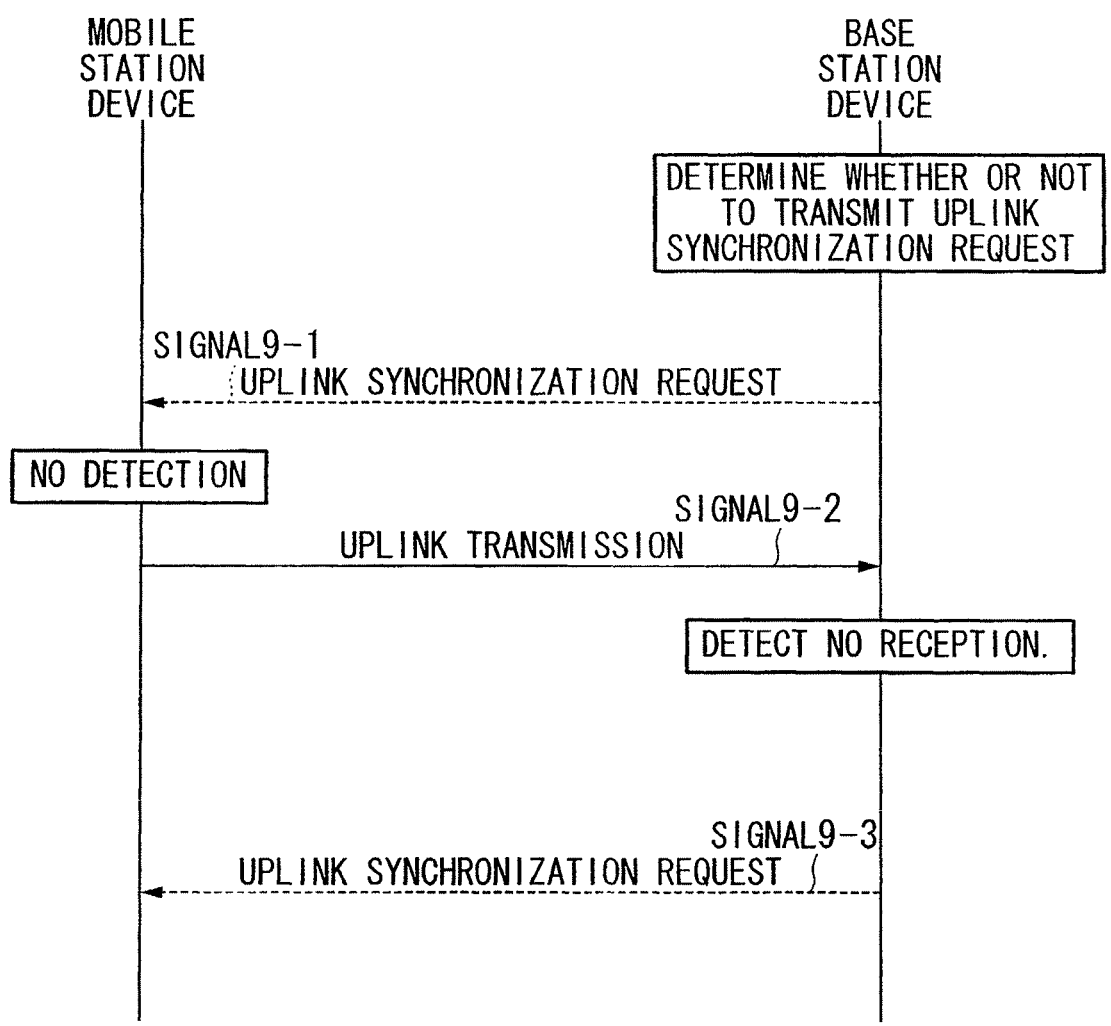
FIG. 9 is a sequence chart illustrating another process of the mobile station device of the embodiment when a CRC for PDCCH fails, which is different from the process shown in FIG. 8.

FIG. 9 is a sequence chart illustrating another process of the mobile station device when a CRC for PDCCH fails. The base station device manages uplink synchronization with mobile station devices by, for example, setting a time. If an uplink transmission has not been performed for a given time period, or if uplink synchronization information has not been updated for a given time period, the base station device determines that an uplink re-synchronization factor occurs. Alternatively, if the base station device receives uplink transmission data or a transmission signal from a mobile station device and detects a reception timing shift, the base station device determines that an uplink re-synchronization factor occurs. When the base station device detects an arrival of data (transmission data and reception data) addressed to the mobile station device requiring re-synchronization, or when the base station device determines that uplink synchronization is to be maintained with the mobile station device requiring uplink re-synchronization, the base station device transmits an uplink synchronization request to the mobile station device. The uplink synchronization request is transmitted over PDCCH (signal 9-1).

The control data extractor 55 of the mobile station device calculates a CRC for each downlink control information item of the PDCCH to find one identical to the value of C-RNTI of the mobile station device. However, it is assumed here that the downlink control information cannot be correctly received due to a bad reception condition of the mobile station device and the calculated CRC does not match the value of the C-RNTI. Since the mobile station device cannot detect an uplink synchronization request, the mobile station device performs an uplink transmission (signal 9-2). The uplink transmission is not a dynamic uplink transmission over PDCCH, but a data transmission over UL-SCH to which a transmission scheme, transmission resources, and the like are preliminarily set by, for example, RRC signaling at the Layer 3 level, or a transmission of CQI feedback over PUCCH. When the base station device detects the uplink transmission, the base station device detects that the mobile station device could not receive the uplink synchronization request. Upon detecting that the mobile station device failed the reception, the base station device transmits an uplink synchronization request to the mobile station device requiring an uplink re-synchronization, again (signal 9-3). Since the uplink transmission of the signal 9-2 is a transmission from the mobile station device with which uplink synchronization is lost, whether or not the base station device can correctly detect the signal 9-2 depends on the transmission timing of the mobile station device or radio conditions. Therefore, this sequence functions as a supplemental sequence for the sequence explained in FIG. 8.

Figure 10:
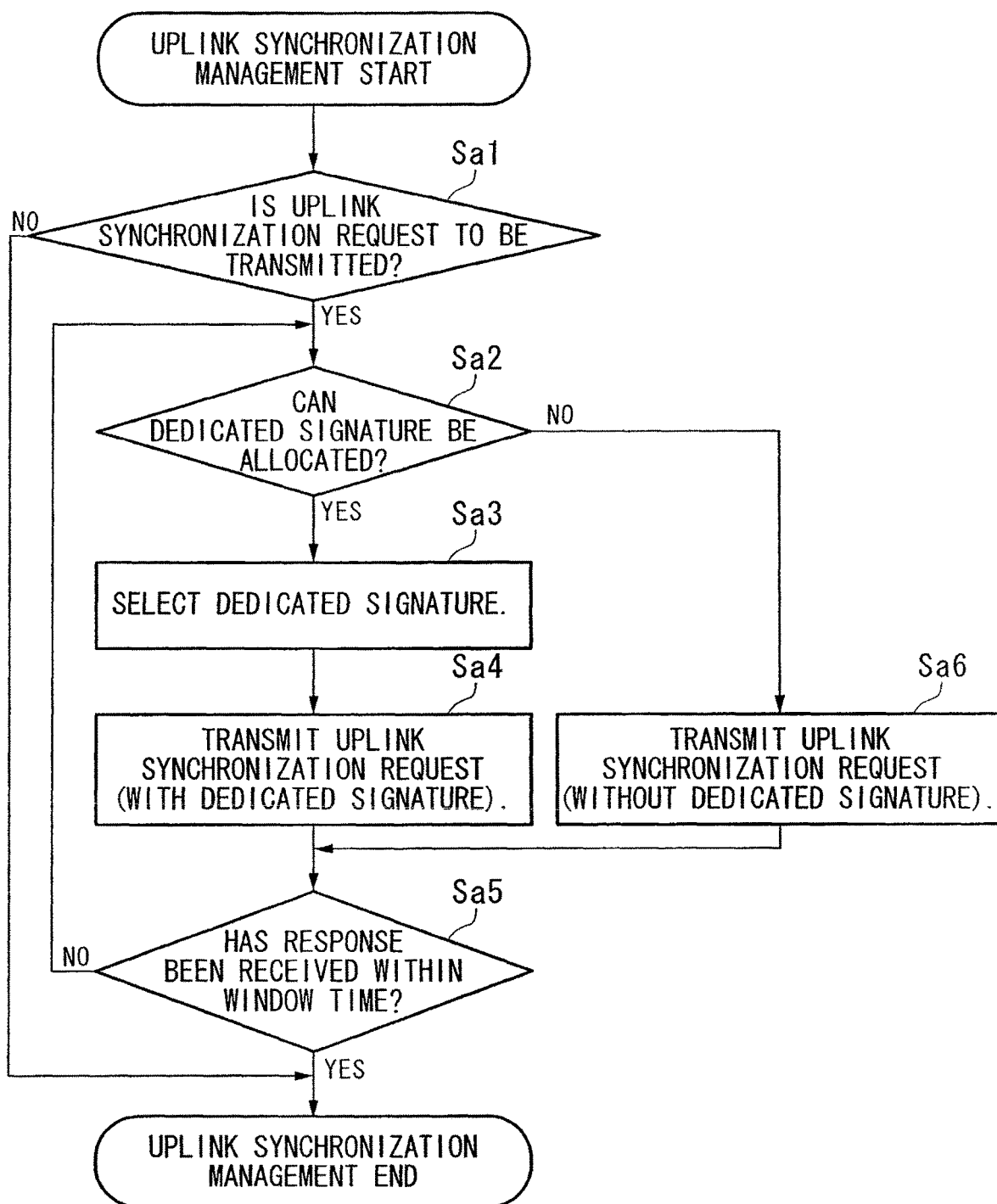
FIG. 10 is a flowchart illustrating an uplink synchronization request transmission process of the base station device of the embodiment.

FIG. 10 is a flowchart illustrating an uplink synchronization transmission process of the base station device. When the UL scheduler 21 or the channel estimator 13 of the base station device detects an uplink re-synchronization factor and then determines to transmit an uplink synchronization request (Sa1), the UL scheduler 21 confirms whether or not a dedicated signature can be allocated, referring to the signature managing unit 17. If a dedicated signature can be allocated (Sa2: YES), the UP scheduler 21 selects a dedicated signature (Sa3). Then, the UL scheduler 21 generates downlink control information including an uplink synchronization request. In the downlink control information, a dedicated signature is registered in the "type" region, and the signature ID number of the selected dedicated signature is registered in the "signature" region in step Sa3. Then, the data controller 10 maps the downlink control information to PDCCH to be transmitted (Sa4).

On the other hand, if the dedicated signature cannot be allocated in step S2 (Sa2: NO), the UL scheduler 21 generates downlink control information including an uplink synchronization request in which a random access signature is set to the "type" region. Then, the data controller 10 maps the downlink control information to PDCCH to be transmitted (Sa6). If the downlink control information including the uplink synchronization request is transmitted in step Sa4 or Sa6, the upper layer unit 30 determines whether or not the preamble detector 16 has received a preamble that is a response to the uplink synchronization request within a predetermined window time, that is, within a radio frame specified by the "frame number" of the uplink synchronization request. If the preamble has not been received (Sa5: NO), the routine returns back to step Sa2, and the uplink synchronization request process is performed again. On the other hand, if it is determined in step Sa5 that the preamble has been received (Sa5: YES), the uplink synchronization request transmission process ends.

Figure 11:
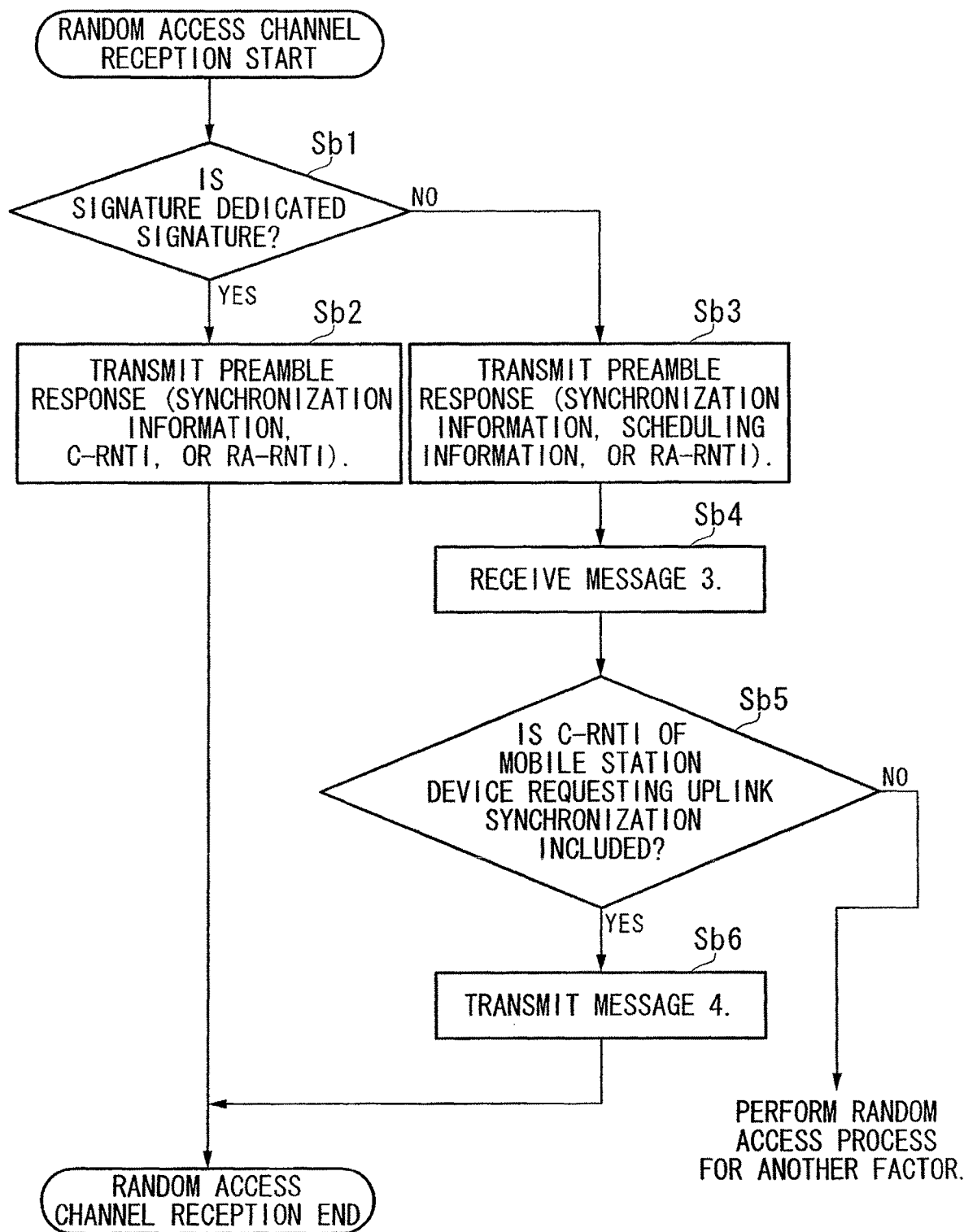
FIG. 11 is a flowchart illustrating a random access reception process of the base station device of the embodiment.

FIG. 11 is a flowchart illustrating a random access reception process of the base station device. When the preamble detector 16 of the base station device detects a preamble on RACH, the preamble detector 16 refers to the signature managing unit 17 and determines whether or not the signature included in the preamble is a dedicated signature (Sb1). If it is determined in step Sb1 that the signature is a dedicated signature, the preamble detector 16 indicates to the upper layer unit 30 the synchronization shift measured upon detecting the preamble. Upon receiving the synchronization shift, the upper layer unit 30 outputs to the data controller 10 a preamble response including the synchronization information concerning the synchronization shift. Then, the preamble response is transmitted (Sb2), and then the random access reception process ends. On the other hand, if it is determined in step Sb1 that the signature is not a dedicated signature, the upper layer unit 30 outputs a preamble response including synchronization information and the scheduling information included in the message 3 shown in FIG. 7. Then, the preamble response is transmitted (Sb3), and a process of receiving the message 3 starts. If the message 3 is received (Sb4), the upper layer unit 30 confirms whether or not C-RNTI of the mobile station device requesting uplink synchronization is included in the message 3 (Sb5). If C-RNTI or another ID of a mobile station device other than the mobile station device requesting uplink synchronization, a random access process for another factor is performed (Sb5: NO). If C-RNTI of the mobile station device requesting an uplink synchronization is detected (Sb5: YES), the upper layer unit 30 generates a message 4 shown in FIG. 4, and outputs the generated message 4 to the data controller 10. Then, the message 4 is transmitted (Sb6), and the random access reception process ends.

Figure 12:
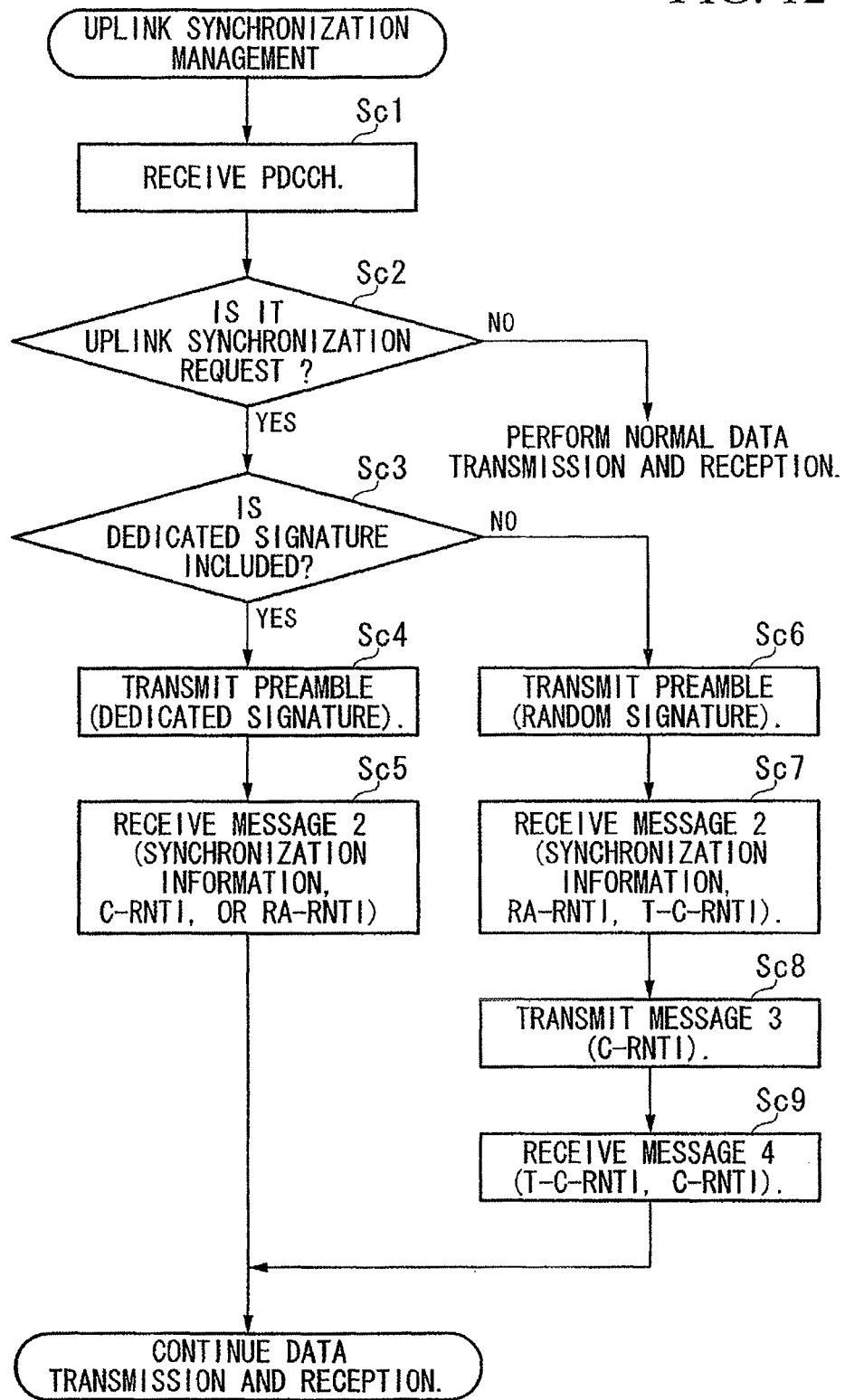
FIG. 12 is a flowchart illustrating an uplink synchronization management process of the mobile station device of the embodiment.
Figure 13:
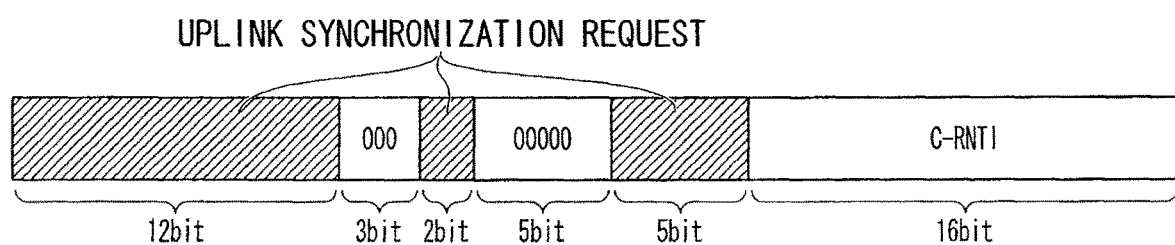
FIG. 13 illustrates, as a modification of the embodiment, a format when an uplink synchronization request is allocated to a region of downlink control information.

FIG. 12 is a flowchart illustrating an uplink synchronization management process of the mobile station device. Upon detecting C-RNTI of the mobile station device on PDCCH (Sc1), the control data extractor 55 of the mobile station device determines whether or not "no resource assignment" is set to the resource assignment region to determine whether or not it is an uplink synchronization request (Sc2). If it is determined in step Sc2 that it is not an uplink synchronization request (Sc2: NO), normal data transmission and/or reception are performed. On the other hand, if it is determined in step Sc2 that it is an uplink synchronization request (Sc2: YES), the upper layer unit 60 receiving the uplink synchronization request from the control data extractor 55 obtains information indicative of the type of signatures from the "type" region included in the uplink synchronization request. Then, the upper layer unit 60 determines whether or not a dedicated signature is included (Sc3), and suspends an uplink transmission.

If it is determined in step Sc3 that the dedicated signature is included (Sc3: YES), the upper layer unit 60 instructs, through the signature selector 58, the preamble generator 57 to transmit a preamble including the dedicated signature. The preamble generator 57 generates a preamble including the dedicated signature, and outputs the generated preamble to the DFT-S-OFDM modulator 51. Thus, the preamble is transmitted (Sc4). After the preamble including the dedicated signature is transmitted, the mobile station device receives the message 2 shown in FIG. 6 which is a response to the preamble (Sc5). The control data extractor 55 obtains synchronization information from the message 2, and then sets the synchronization information to the synchronization aligner 56. Then, the mobile station device continues data transmission and/or reception.

On the other hand, if it is determined in step Sc3 that a dedicated signature is not included (Sc3: NO), the upper layer unit 60 instructs the signature selector 58 to select a signature. Upon receiving the instruction, the signature selector 58 randomly selects a signature, and outputs the signature ID number of the selected signature to the preamble generator 57. The preamble generator 57 generates a preamble including the signature corresponding to the signature ID number, and outputs the preamble to the DFT-S-OFDM modulator 51. Thus, the preamble is transmitted (Sc6). After transmitting the preamble including the randomly selected signature, the mobile station device receives the message 2 shown in FIG. 7 which is a response to the preamble (Sc7). The mobile station device obtains, from the message 2, mapping information concerning synchronization information and a signature, mapping information concerning a signature and a new C-RNTI (T-C-RNTI), and scheduling information included in the message 3. The mobile station device transmits the message 3 including the C-RNTI of the mobile station device based on the obtained scheduling information (Sc8). After the message 4 is received (Sc9), the mobile station device continues data transmission and/or reception.

Thus, in the embodiment, when uplink timing synchronization is maintained between the base station device and the mobile station device, an uplink synchronization request is included in downlink control information on PDCCH used for transmitting communication parameters by setting "no resource assignment" to the resource assignment region of the downlink control information, so that the set parameter is distinguished from that to be transmitted when uplink synchronization is maintained. Thus, excellent utilization efficiency of radio resources can be achieved. This method uses the fact that communication parameters to be used when uplink synchronization is maintained do not have to be transmitted since uplink re-synchronization is always required for transmitting an uplink synchronization request, and the fact that "no resource assignment" does not have to be transmitted as a communication parameter to be used when uplink synchronization is maintained.

The physical format of the PDCCH is used for both communication parameters to be used when uplink synchronization is maintained, and an uplink synchronization request. For this reason, when the mobile station device detects "no resource assignment" by data processing in a normal PDCCH reception process, it may be determined that it is an uplink synchronization request. Therefore, the mobile station device has no need to receive an uplink synchronization request by a specific physical process. Thus, the mobile station device can receive an uplink synchronization request by a normal data reception process. For this reason, the base station device can transmit an uplink synchronization request in any timing.

Figure 14:
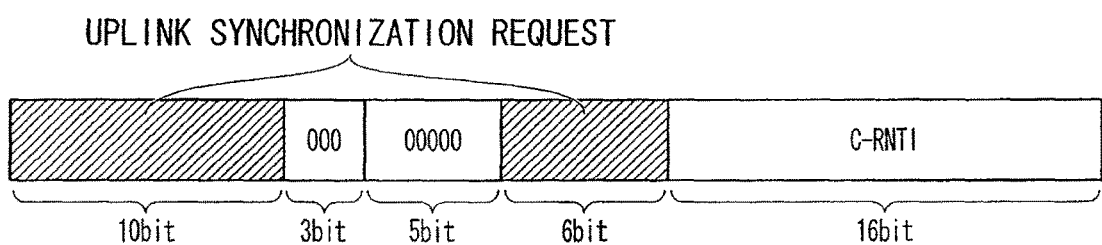
FIG. 14 illustrates, as a modification of the embodiment, a format when an uplink synchronization request is allocated to a region of uplink control information.
Figure 15:
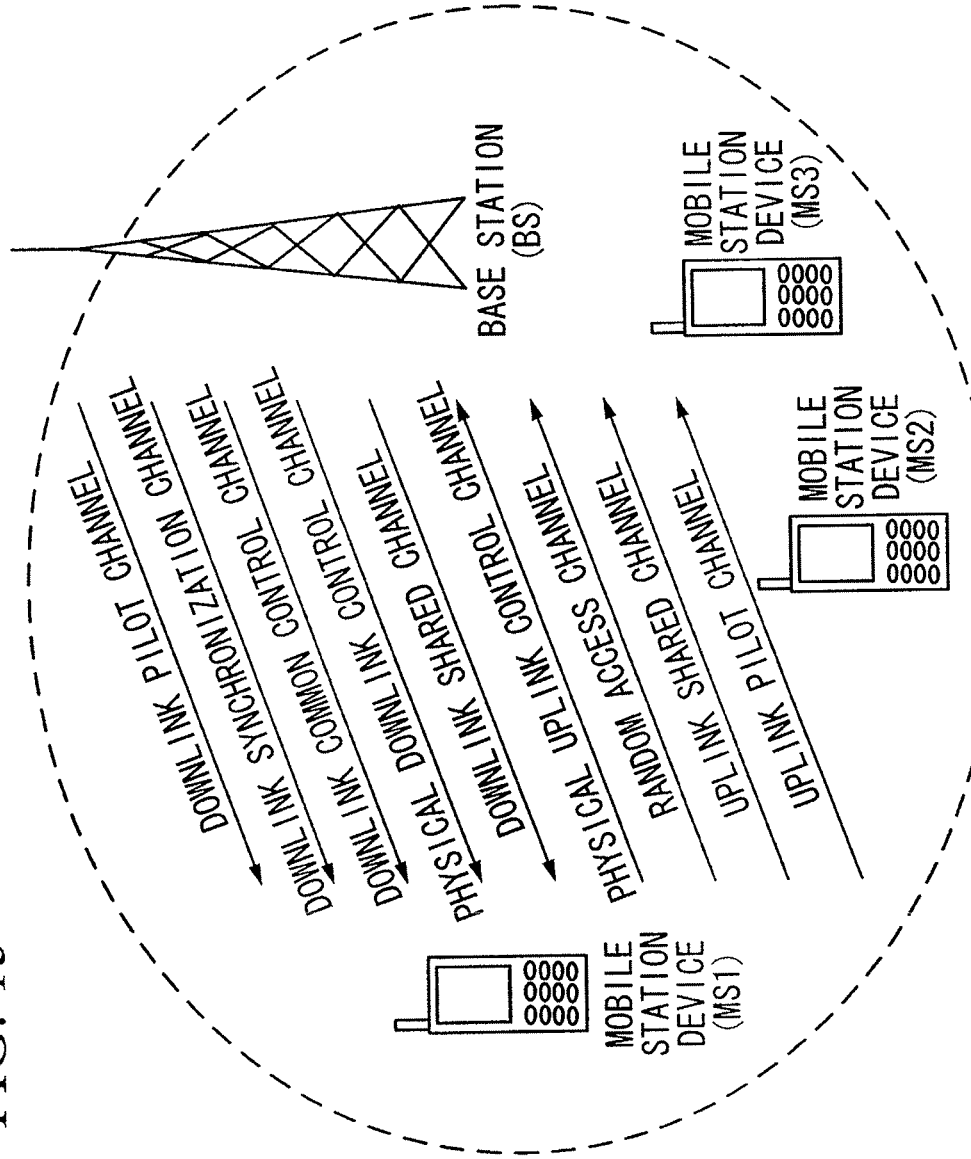
FIG. 15 illustrates a configuration of uplink and downlink channels in conventional EUTRA.
Figure 16:
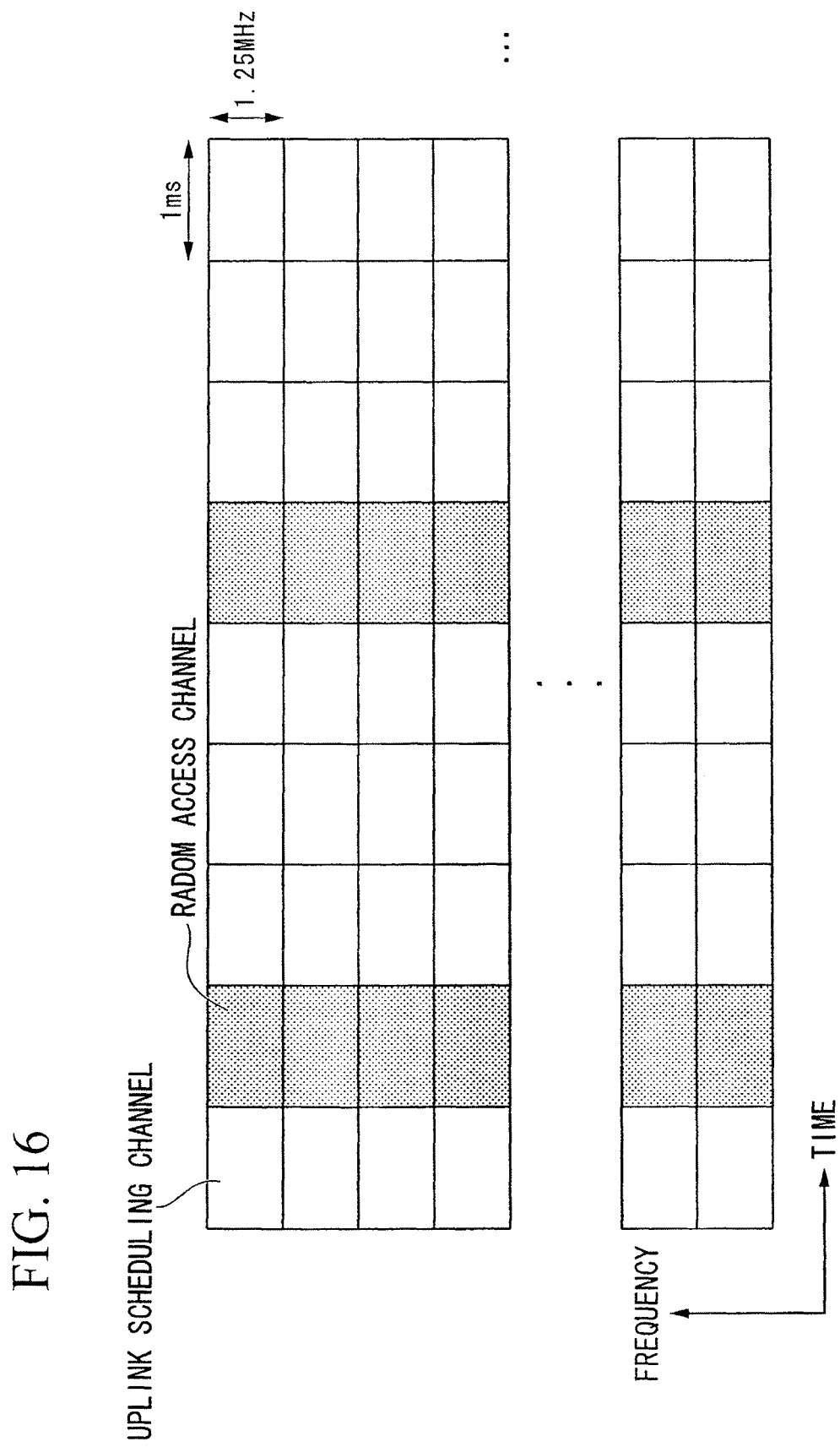
FIG. 16 illustrates an example of RACH and UL-SCH being allocated to radio resources in the conventional EUTRA.
Figure 17:
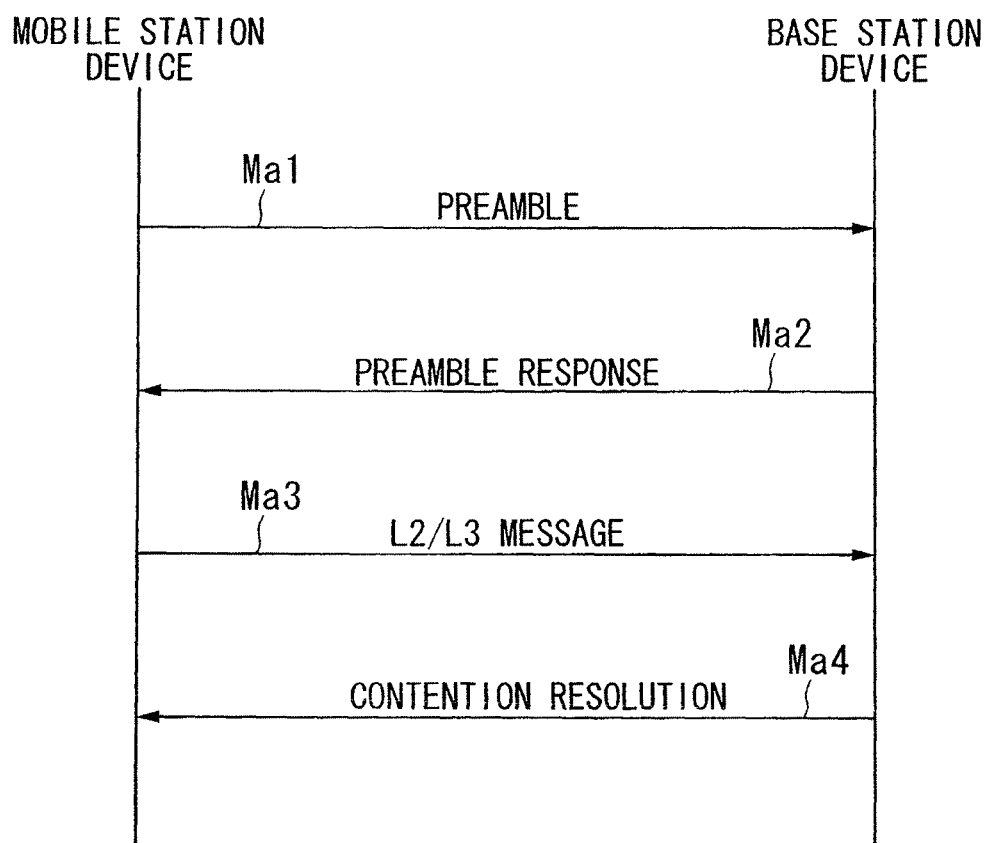
FIG. 17 is a sequence chart illustrating an uplink synchronization using RACH in the conventional EUTRA.
Figure 18:
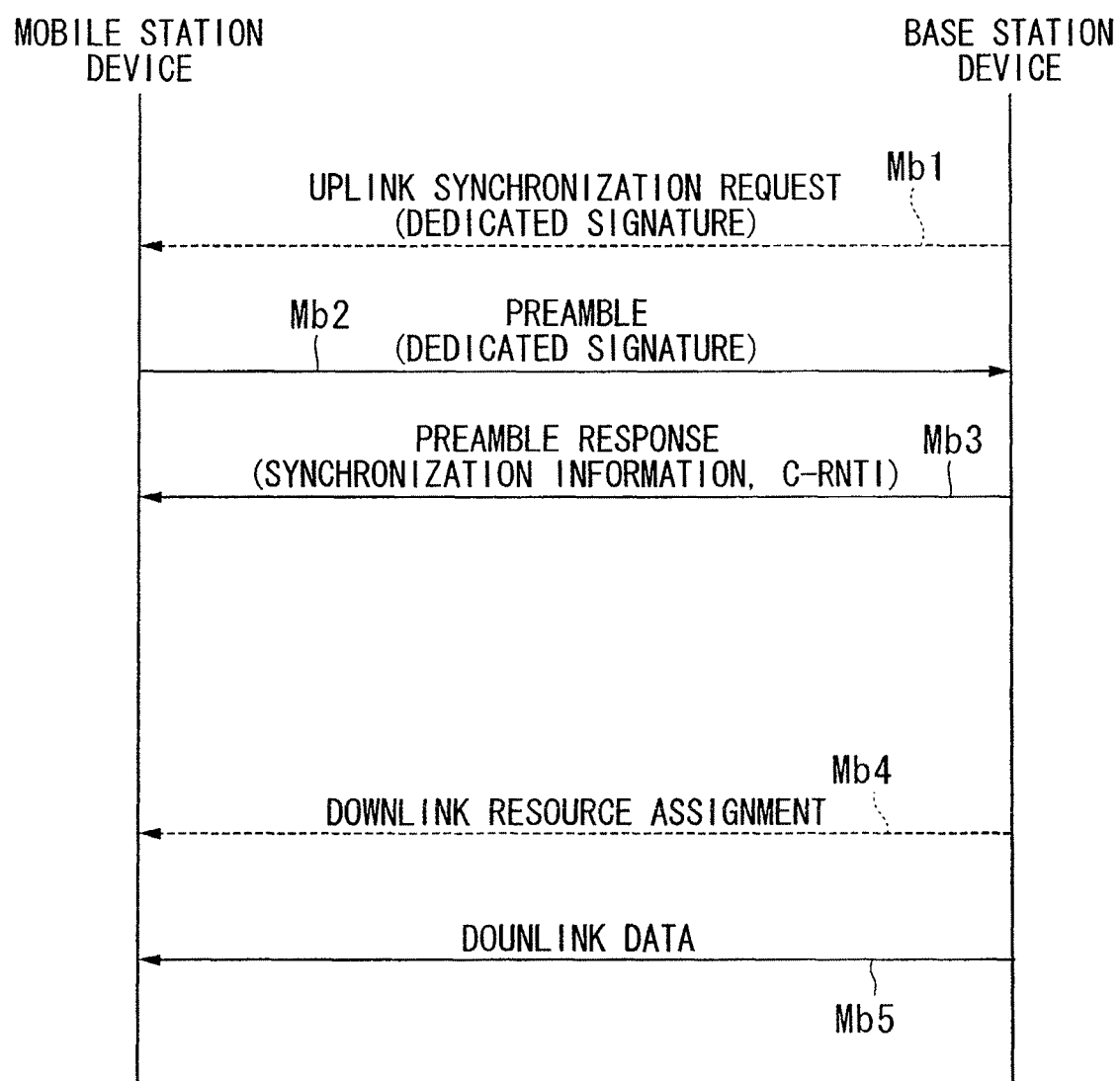
FIG. 18 is a sequence chart illustrating a method of preventing a collision of random accesses when a downlink data transmission is resumed in the conventional EUTRA.

In the embodiment, an uplink synchronization request is set to a region included in the downlink control information shown in FIG. 3. However, an uplink synchronization request may be set to a region included in uplink control information by setting "0" to the MCS or the payload size, or by setting information indicative of "no resource assignment" to 10 bits of data to which uplink resource assignment information is to be set so that an uplink synchronization request can be identified, as shown in FIG. 14. Alternatively, an uplink synchronization request may be identified by setting "0" to the MCS or the payload size included in downlink control information, as shown in FIG. 14.

Alternatively, an uplink synchronization request may be allocated to both a region included in downlink control information and a region included in uplink control information.

The upper layer unit 30, the data controller 10, the OFDM modulator 11, the scheduler 12, the channel estimator 13, the DFT-S-OFDM demodulator 14, the control data extractor 15, the preamble detector 16, and the signature managing unit 17, which are shown in FIG. 4; or the upper layer unit 60, the data controller 50, the DFT-S-OFDM modulator 51, the scheduler 52, the OFDM demodulator 53, the channel estimator 54, the control data extractor 55, the synchronization aligner 56, the preamble generator 57, and the signature selector 58, which are shown in FIG. 5, may be implemented by a program implementing the functions of those units being stored in a computer readable recording medium, and by the program being read and executed by a computer system. The "computer system" includes OS, and hardware, such as peripheral devices.

Additionally, the "computer system" includes home page provision environments (or display environments) if a WWW system is used.

The "computer-readable recording medium" includes a portable medium, such as a flexible disk, an optical disc, a ROM, a CD-ROM, and the like, and a storage device such as a hard disk installed in a computer system. The "computer-readable recording medium" includes a medium dynamically storing a program for a short period, such as a communication line when a program is transmitted through a network such as the Internet or a communication line such as a telephone line. Additionally, the "computer-readable recording medium" includes a medium storing a program for a given period, such as volatile memory in a computer system of a server or a client in the above case. The program may be for implementing a part of the aforementioned functions or for implementing the aforementioned functions with a combination of the program and another program stored in the computer system.

As explained above, the following configurations can be made in the embodiment.

A base station device according to the embodiment includes: a data controller that generates data in which information indicative of an uplink synchronization request addressed to a mobile station device is set to a region on a radio frame to which parameters to be used for synchronous communication with the mobile station device are set; a transmitter that transmits the data generated by the data controller; and a receiver that receives a signal for measuring a synchronization shift based on the information indicative of the uplink synchronization request, the signal being transmitted from the mobile station device.

The base station device further includes: a re-synchronization factor detector that detects an uplink re-synchronization factor of the mobile station device. The data controller generates the data when the re-synchronization factor detector detects the uplink re-synchronization factor.

In the base station device, the data controller generates data in which the information indicative of the uplink synchronization request and order information concerning measurement signal identification information to be included in the signal transmitted from the mobile station device receiving the uplink synchronization request are set to the region.

In the base station device, the order information is any one of information to specify a value of the measurement signal identification information and information to order the mobile station device to select a value of the measurement signal identification information.

In the base station device, the region is a downlink shared control channel for downlink control.

A mobile station device according to the embodiment includes: a control data extractor that refers to a region on a radio frame of a reception data, parameters to be used for synchronous communication with a base station device being set to the region, and detects, when a predetermined value is set to a predetermined part of the region, the predetermined value as information indicative of an uplink synchronization request; a measurement signal generator that generates a signal for measuring a synchronization shift when the information indicative of the uplink synchronization request is detected; and a transmitter that transmits the signal.

In the mobile station device, the control data extractor obtains, from the region, order information concerning measurement signal identification information to be included in the signal when detecting the information indicative of the uplink synchronization request.

In the mobile station device, the order information is any one of information to specify a value of the measurement signal identification information and information to order the mobile station device to select a value of the measurement signal identification information. The measurement signal generator generates the signal including measurement signal identification information having a value corresponding to the order information.

In the mobile station device, the region is a downlink shared control channel for downlink control.

In the mobile station device, the transmitter transmits the signal using a random access channel.

A method according to the embodiment is provided for a base station device to request uplink synchronization. The method includes: a first step of generating data in which information indicative of an uplink synchronization request addressed to a mobile station device is set to a region on a radio frame to which parameters to be used for synchronous communication with the mobile station device are set; a second step of transmitting the data generated; and a third step of receiving a signal for measuring a synchronization shift based on the information indicative of the uplink synchronization request, the signal being transmitted from the mobile station device.

A method according to the embodiment is provided for a mobile station device to transmit a signal for measuring a synchronization shift. The method includes: a first step of referring to a region on a radio frame to which parameters to be used for synchronous communication with a base station device are set within reception data, and detecting, when a predetermined value is set to a predetermined part of the region, the predetermined value as information indicative of an uplink synchronization request; a second step of generating the signal when detecting the information indicative of the uplink synchronization request; and a third step of transmitting the signal.

Although the embodiment is explained with reference to the drawings, specific configuration is not limited to the embodiment, and various modifications can be made without departing from the scope of the present invention.

INDUSTRIAL APPLICABILITY

The present invention is suited to, but not limited to, a mobile telephone system including a mobile telephone terminal as a mobile station device.

What is claimed:

1. A mobile station device included in a mobile communication system, the mobile station device comprising:
   a receiver configured to receive control information having a downlink control information format and being addressed to the mobile station device, on a physical downlink control channel from a base station device; and
   a transmitter configured to transmit a random access preamble using a random access channel to the base station device based on receiving the control information which provides a random access order, wherein
   the downlink control information format includes a first field to be used for downlink resource assignment,
   in a first case that the downlink control information format is used for the random access order, a first value is set to the first field,
   in a second case that the downlink control information format is used for downlink scheduling, a second value is set to the first field, and
   the first value is different from the second value.

2. The mobile station device according to claim 1, wherein in the second case, a third value specifying the random access preamble is set to the downlink control information format.

3. The mobile station device according to claim 2, wherein in the second case, a fourth value specifying a region on a radio frame available for random access is set to the downlink control information format.

4. The mobile station device according to claim 1, wherein
   the downlink control information format is used with the same total number of bits for both the downlink scheduling and for the random access order.

5. A base station device included in a mobile communication system, the base station device comprising:
   a transmitter configured to transmit control information having a downlink control information format and being addressed to a mobile station device, on a physical downlink control channel to the mobile station device; and
   a receiver configured to receive a random access preamble using a random access channel from the mobile station device based on receiving the downlink control information which provides a random access order, wherein
   the downlink control information format includes a first field to be used for downlink resource assignment,
   in a first case that the downlink control information format is used for the random access order, a first value is set to the first field,
   in a second case that the downlink control information format is used for downlink scheduling, a second value is set to the first field, and
   the first value is different from the second value.

6. The base station device according to claim 5, wherein in the second case, a third value specifying the random access preamble is set to the downlink control information format.

7. The base station device according to claim 6, wherein in the second case, a fourth value specifying a region on a radio frame available for random access is set to the downlink control information format.

8. The base station device according to claim 5, wherein
   the downlink control information format is used with the same total number of bits for both the downlink scheduling and for the random access order.

9. A processing method for a mobile station device included in a mobile communication system, the processing method comprising:
   receiving control information having a downlink control information format and being addressed to the mobile station device, on a physical downlink control channel from a base station device; and
   transmitting a random access preamble using a random access channel to the base station device based on receiving the control information which provides a random access order, wherein
   the downlink control information format includes a first field to be used for downlink resource assignment,
   in a first case that the downlink control information format is used for the random access order, a first value is set to the first field,
   in a second case that the downlink control information format is used for downlink scheduling, a second value is set to the first field, and
   the first value is different from the second value.

10. A processing method for a base station device included in a mobile communication system, the processing method comprising:
    transmitting control information having a downlink control information format and being addressed to a mobile station device, on a physical downlink control channel to the mobile station device; and
    receiving a random access preamble using a random access channel from the mobile station device based on receiving the downlink control information which provides a random access order, wherein
    the downlink control information format includes a first field to be used for downlink resource assignment,
    in a first case that the downlink control information format is used for the random access order, a first value is set to the first field,
    in a second case that the downlink control information format is used for downlink scheduling, a second value is set to the first field, and
    the first value is different from the second value.

11. The processing method according to claim 10, wherein in the second case, a third value specifying the random access preamble is set to the downlink control information format.

12. The processing method according to claim 9, wherein
    the downlink control information format is used with the same total number of bits for both the downlink scheduling and for the random access order.

13. The processing method according to claim 9, wherein in the second case, a third value specifying the random access preamble is set to the downlink control information format.

14. The processing method according to claim 13, wherein in the second case, a fourth value specifying a region on a radio frame available for random access is set to the downlink control information format.

15. The base station device according to claim 11, wherein in the second case, a fourth value specifying a region on a radio frame available for random access is set to the downlink control information format.

16. The processing method according to claim 10, wherein
   the downlink control information format is used with the same total number of bits for both the downlink scheduling and for the random access order.

* * * * *